United States Patent
Morrison et al.

(10) Patent No.: US 9,578,295 B1
(45) Date of Patent: Feb. 21, 2017

(54) CALIBRATION FEATURE MASKING IN OVERLAP REGIONS TO IMPROVE MARK DETECTABILITY

(71) Applicant: CANON KABUSHIKI KAISHA, Tokyo (JP)

(72) Inventors: Paul William Morrison, Erskine Park (AU); Cameron Murray Edwards, Clovelly (AU); Eric Wai-Shing Chong, Carlingford (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/975,431

(22) Filed: Dec. 18, 2015

(51) Int. Cl.
  *H04N 3/223* (2006.01)
  *H04N 3/22* (2006.01)
  *H04N 9/31* (2006.01)
  *G06T 7/00* (2006.01)

(52) U.S. Cl.
  CPC .......... *H04N 9/3185* (2013.01); *G06T 7/0028* (2013.01); *H04N 9/3147* (2013.01); *H04N 9/3194* (2013.01); *G06T 2207/30208* (2013.01)

(58) Field of Classification Search
  CPC .. H04N 9/3185; H04N 9/3147; H04N 9/3194; H04N 9/31; H04N 9/3182; G06T 7/0028; G06T 2207/30208; G09G 5/10; G09G 2320/0233
  USPC ....... 348/744–747, 806, 807, 180, 188, 182; 353/30, 34, 94, 48, 49; 345/589, 629, 345/630, 641, 9
  IPC ................ H04N 9/31, 3/223, 3/227, 3/22, 3/26, 17/00, 17/02
  See application file for complete search history.

(56) References Cited

U.S. PATENT DOCUMENTS

| | | | |
|---|---|---|---|
| 7,182,465 B2 | 2/2007 | Fuchs et al. | |
| 8,251,512 B2 | 8/2012 | Adkins et al. | |
| 8,427,507 B2 | 4/2013 | Uchida et al. | |
| 2011/0234920 A1* | 9/2011 | Nelson | H04N 9/3147 348/745 |
| 2013/0169888 A1* | 7/2013 | Tannhauser | H04N 9/3188 348/745 |

OTHER PUBLICATIONS

Alex Butler, Shake'n'Sense: Reducing Interference for Overlapping Structured Light Depth Cameras, Session: Sensory Interaction Modalities, CHI 2012, May 5-10, 2012, Austin, Texas USA.

* cited by examiner

*Primary Examiner* — Sherrie Hsia
(74) *Attorney, Agent, or Firm* — Canon USA, Inc., IP Division

(57) ABSTRACT

A method of displaying an image using at least a first projector and a second projector includes projecting a calibration pattern using the first projector, the calibration pattern being embedded in a first portion of an image projected by the first projector. The method determines a contribution of the second projector to projecting a second portion of the image to an overlap area, the overlap area having a contribution from the first and second projectors, wherein the contribution is an intensity of a color channel. The determined contribution of the second projector to the overlap area is modified to allow the calibration pattern of the first projector to be detectable to a capture device, the modification having a pattern corresponding to the calibration pattern. The image is then displayed using the first projector and the modified contribution of the second projector.

21 Claims, 16 Drawing Sheets

CALIBRATION FEATURE MASKING IN OVERLAP REGIONS TO IMPROVE MARK DETECTABILITY

TECHNICAL FIELD

The present invention relates generally to the field of multi-projector system alignment and, in particular, to a method, apparatus and system for increasing the detectability of projected calibration marks in a multi-projector system. The present invention also relates to a computer program product including a computer readable medium having recorded thereon a computer program for increasing the detectability of projected calibration marks in a multi-projector system.

BACKGROUND

Projectors are display devices and can be used to produce an image on many surface types. Multiple projectors are commonly used to increase the size of a projection onto a projection surface whilst retaining high resolution and brightness. For example, four projectors can be arranged in a grid configuration to produce a single image that is four times larger than the image produced by a single projector.

A problem of such multi-projector systems is the geometric alignment of the projected images on the projection surface. It is important that a viewer perceives a single image that has no visible seams or brightness fluctuations. Precise alignment of the projected images is therefore very important. Many current multi-projection systems require a significant amount of manual effort to perform alignment. Some prior art systems perform an automated alignment procedure at system installation time, for example using projected calibration patterns or structured light patterns, commonly known in the art. However, multi-projector systems may fall out of alignment over time, for example, due to physical movement of a projector or surface, building vibration, or heat fluctuations causing small movement of the internal components of one or more of the projectors of the system. When such systems become unaligned, the manual or automated alignment procedure typically needs to be re-run.

Other prior art is capable of continuous automatic alignment of multiple projectors. While visible content is being displayed (e.g. a video or image), calibration patterns are also displayed, and are photographed by one or more cameras. The calibration patterns may be in the infrared spectrum and thus not distracting to viewers of the desired projected content. Alternatively, the calibration patterns may be embedded in images of the projected content, preferably in such a way that the viewer is unable to perceive or be distracted by the calibration patterns. This latter approach has the advantage that it does not require an additional light source (e.g. infrared emitter), and that a simple and inexpensive camera can be used to photograph the projected pattern.

However, one problem with projecting a calibration pattern in the visible spectrum, including when the calibration pattern is embedded in a projected content image, is that, in a multi-projector system, overlapping projections may reduce the detectability of the calibration pattern. This limits the regions of the projection surface that can be used for calibration, which reduces the accuracy of the alignment procedure.

SUMMARY

It is an object of the present invention to substantially overcome, or at least ameliorate, one or more deficiencies of existing projection arrangements.

According to one aspect of the present disclosure, there is provided a method of displaying an image using at least a first projector and a second projector, the method comprising: projecting a calibration pattern using the first projector, the calibration pattern being embedded in a first portion of an image projected by the first projector; determining a contribution of the second projector to projecting a second portion of the image to an overlap area, the overlap area having a contribution from the first and second projectors, wherein the contribution is an intensity of a colour channel; modifying the determined contribution of the second projector to the overlap area to allow the calibration pattern of the first projector to be detectable to a capture device, the modification having a pattern corresponding to the calibration pattern; and displaying the image using the first projector and the modified contribution of the second projector.

Desirably, the modified contribution of the second projector in the overlap area is complementary to a contribution of the first projector.

Preferably, the calibration pattern has a temporal variation and the modification to the determined contribution varies spatially according to the temporal variation.

Advantageously, the contribution of the first projector in the overlap area is complementary to the contribution of the second projector such that the first portion of the image in the overlap area is modified to prevent the contribution of the first projector saturating when the calibration pattern is embedded.

In a specific implementation, the determined contribution of the second projector is increased over a predetermined period of time to reduce user perception of changes to the image.

In other examples, a value of the modification to the determined contribution is dependent on the determining contribution of the second projector.

In some arrangements, the calibration pattern is selected from the group consisting of a plurality of regularly positioned marks, a plurality of randomly positioned marks, a regular grid, an irregular grid, and the marks.

In specific implementations, the calibration pattern comprises a plurality of marks, and the method further comprises the steps of: estimating an accuracy of alignment of the image from the first and second projector in the overlap area; and determining a size of a spatial area of the modification of the determined contribution to be applied about the plurality of marks, the size of the spatial area being determined according to the estimated accuracy of the alignment.

Desirably, modification of the determined contribution varies spatially across the overlap area.

Advantageously, the modification of the determined contribution is determined according to a predetermined vignetting of the second projector.

Preferably, the calibration pattern comprises a plurality of marks and a size and intensity of the modification of the determined contribution of the second projector is varied according to properties of the capture device.

Desirably, the contribution of each of the first and second projectors to the overlap area is varied according to a blend function and the modification of the determined contribution of the second projector is varied according to the blend function.

Other arrangements further comprise determining an external lighting contribution to the overlap with the capture device; and modifying the determined contribution of the second projector according to the determined external lighting contribution.

Other aspects, including computer program products, readable media, a projector controller and a projection system, are also disclosed.

BRIEF DESCRIPTION OF THE DRAWINGS

At least one embodiment of the invention will now be described with reference to the following drawings, in which.

DETAILED DESCRIPTION INCLUDING BEST MODE

Context

Figure 1:
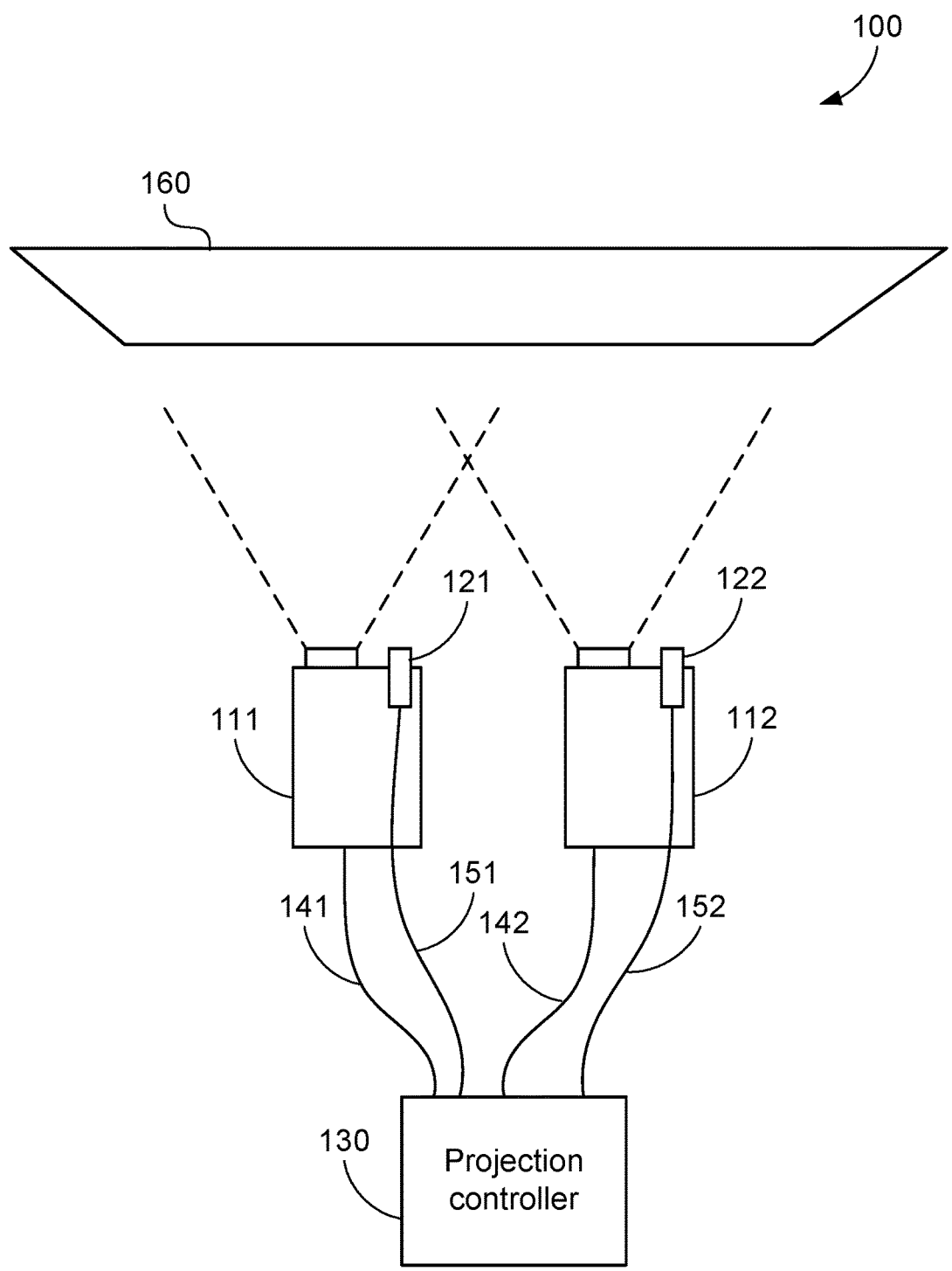
FIG. 1 shows an example of a multi-projector system according to the present disclosure.

FIG. 1: System Configuration

FIG. 1 shows an example of a multi-projector system 100. The multi-projector system 100 includes a left-side projector 111, a left-side camera 121, a right-side projector 112, and a right-side camera 122. A projection controller 130 sends images to each projector 111 and 112 via display cables 141 and 142, respectively. The projection controller 130 receives images from each camera 121 and 122 via cables 151 and 152, respectively. Each projector 111 and 112 projects images sent by the projection controller 130 onto a projection surface 160. In the example, the projection surface 160 is planar (i.e. flat), noting that FIG. 1 seeks to illustrate this attribute using a perspective view from above of the surface 160. In other implementations, the projection surface 160 may be curved or some other irregular shape, for example.

The left-side camera 121 preferably captures an image containing the entire projection of the left-side projector 111 on the projection surface 160, and a portion of the projection of the right-side projector 112 on the projection surface 160. Similarly, the right-side camera 122 preferably captures an image containing the entire projection of the right-side projector 112 on the projection surface 160, and a portion of the projection of the left-side projector 111 on the projection surface 160. The projection controller 130 therefore receives images from the cameras 121 and 122 of the images that are projected with projectors 111 and 112.

Each camera is preferably mounted on the corresponding projector at a fixed position. For example, the left-side camera 121 is preferably fixed to the left-side projector 111, and the right-side camera 122 is preferably fixed to the right-side projector 112. Alternatively, a camera may be integrated within a projector to form a unitary single device that can project and capture images.

It is an object of the multi-projector system 100 to display a single aligned content image on the projection surface 160. Each projector 111 and 112 projects a portion of the single aligned content image. A calibration pattern is embedded within each portion of the content image projected by the projectors 111 and 112. The projection controller 130 uses images of the calibration pattern captured by the cameras 121 and 122 to align the portions of the content image. The content image displayed on the projection surface 160 appears to a viewer to be a single, upright image, with no seam between the two projected images.

The arrangements presently disclosed a method of projecting a calibration pattern embedded within content image, as performed by the projection controller 130. Other configurations include more than two projectors, and/or one or more cameras. In a preferred configuration, the projection controller 130 is implemented by means of a software program executable on a general purpose computer (PC). In alternative arrangements, the projection controller 130 can be embedded within a projector, or is executed by a projection controller device.

FIG. 2: Alignment Example

Figure 2A:
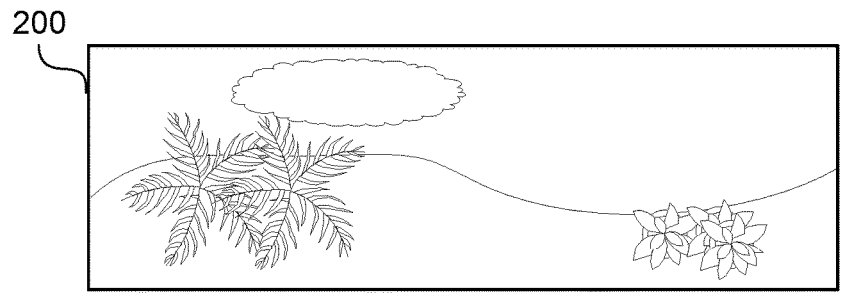
FIGS. 2A and 2B show an example of the alignment and blending of two projections, for example using the multi-projector system of FIG. 1.

FIG. 2A shows an example of content image 200 to be displayed using the multi-projector system 100. The content image 200 has a wide aspect ratio, and may therefore be optimally displayed using a multi-projector system including two projectors side-by-side, such as the multi-projector system 100.

Figure 2B:
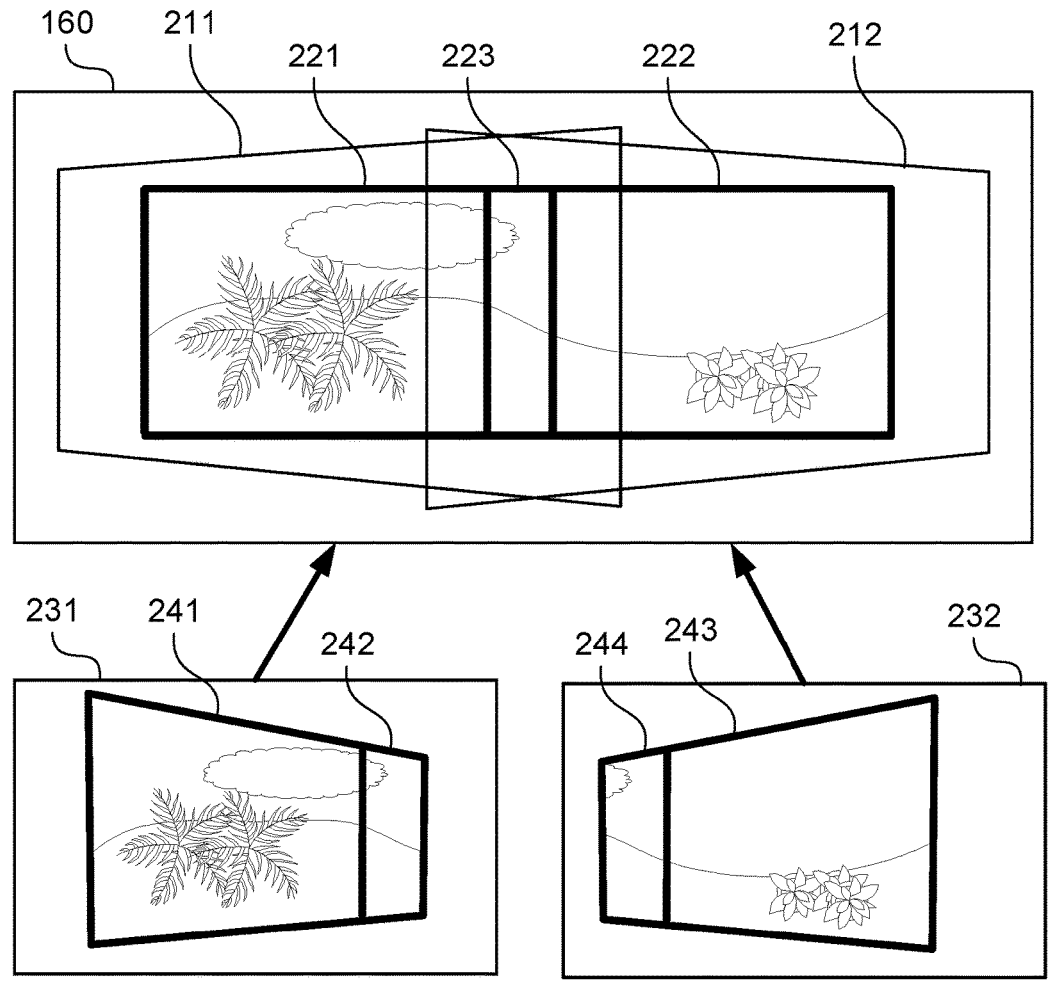

FIG. 2B illustrates the projection of content image 200 using two projectors, for example, by the projectors 111 and 112 of multi-projector system 100. The projector image displayed by the left-side projector 111 is shown in FIG. 2B as projector image 231. The projector image displayed by the right-side projector 112 is shown in FIG. 2B as projector image 232. Each projector image 231 and 232 comprises a rectangular array of projector pixels, for example 1920 horizontal pixels by 1200 vertical pixels. Each projector pixel comprises a number of values representing intensity of particular colour channels. For example, each projector pixel may comprise 1 byte (8 bits) for a red colour channel, 1 byte for a blue colour channel and 1 byte for a green colour channel. If the left-side projector 111 were to project all pixels of the projector image 231, it would result in a large trapezoidal shape 211 on the projection surface 160. Similarly, if the right-side projector 112 were to project all pixels of the projector image 232, it would result in a large trapezoidal shape 212 on the projection surface 160. The projection controller 130 therefore displays the content image 200 using a subset of pixels of each of the projector images 231 and 232.

The left-side projector 111 includes two regions 241 and 242 for displaying two portions of the content image 200 in its projector image 231. The first region 241 contains a portion of the content image 200 that is only projected by the left-side projector 111. The second region 242 contains a portion of the content image 200 that is projected by both the left-side projector 111 and the right-side projector 112. The first region 241 of the projector image 231 is projected onto region 221 of the projection surface 160. The second region 242 of the projector image 231 is projected onto region 223 of the projection surface 160.

The right-side projector 112 includes two regions 243 and 244 for displaying two portions of the content image 200 in its projector image 232. The first region 243 contains a portion of the content image 200 that is only projected by the right-side projector 112. The second region 244 contains a portion of the content image 200 that is projected by both the left-side projector 111 and the right-side projector 112. The first region 243 of the projector image 232 is projected onto region 222 of the projection surface 160. The second region 244 of the projector image 232 is projected onto region 223 of the projection surface 160.

The projected regions 221-223 are aligned on the projection surface 160, such that the overall projected image is upright, and includes no seams between the regions 221-223. Both projectors 111 and 112 project the same portion of the content image onto projected region 223. This region corresponds to region 242 of the left-side projector image 231 and portion 244 of the right-side projector image 232. This overlap of projection is known in the art as "blending". Projection region 223 is therefore known as the "blend region". Within the blend region, both projectors 111 and 112 are said to "contribute" to the projected image.

The blend region 223 is also commonly known as the "overlap region" or "overlap area". In other implementations, the overlap region is the intersection of the regions of the surface that can potentially be projected onto by each of the projectors. For example, with reference to FIG. 2B, the overlap area may be considered to be the intersection of regions 211 and 212, which contains the blend region 223.

The projection controller 130 controls which portions of the content image 200 are included in each projector image 231 and 232, and the boundaries of the regions 241-244 of the content image 200 within each projector image 231 and 232. The projection controller 130 uses this control to ensure the projected regions 221-223 are aligned on the projection surface 160.

FIG. 3: Calibration Pattern Example

As discussed earlier with reference to FIG. 1, a calibration pattern is embedded in a projected content image. A camera captures one or more images of the projected content image, and the embedded calibration pattern is determined. The calibration pattern is decoded, and is used to perform alignment.

Figure 3A:
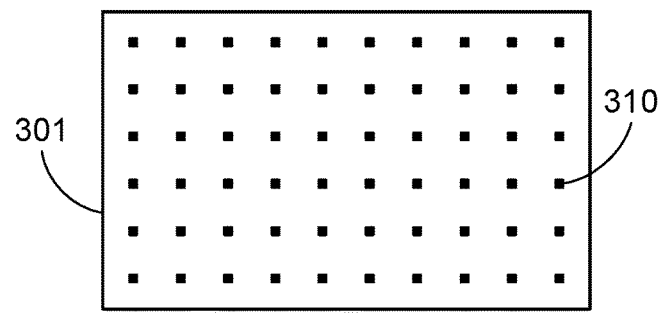
FIG. 3A shows an example of a calibration pattern consisting of a grid of calibration marks.

FIG. 3A shows an example calibration pattern 301. A calibration pattern typically includes or is formed of one or more calibration marks, which can be processed to determine a position within the calibration pattern. Example calibration pattern 301 consists of a simple grid of dots (each mark is a dot), for example, dot 310. A dot is a small group of pixels of a contrasting intensity in comparison with surrounding pixels. For example a dot may be square shaped as illustrated in FIG. 3A, and formed of 4×4 projector pixels. The dimensions (size) of dots should be chosen such that dots are detectable in captured camera images of the projected calibration pattern. Other calibration patterns may include dots at random positions, or other types of calibration marks, such as circles or irregular shapes. The calibration pattern 301 however need not be formed by discrete marks, but may be formed by any structured arrangement of visual features. Examples can include, a regular grid, an irregular grid where the grid lines are spaced according to some formulae. The calibration pattern 301 is preferably the same size as the projector images 231 and 232. This enables a position in a projector image to be determined, by processing the dots in a calibration pattern, for example, captured by a camera such as camera 121.

A calibration pattern 301 is preferably embedded in a projected portion of a content image. It is preferable that a viewer is not able to perceive the presence of the calibration pattern 301. "Pattern subtraction" is a technique known in the art for making a projected calibration pattern imperceptible. In two consecutive frames of projected content, the calibration pattern 310 is respectively added to and also subtracted from the intensity values of the projector image. A projected image with a calibration pattern added is known as a "positive frame". A projected image with a calibration pattern subtracted is known as a "negative frame". If the frames are projected at a high frame rate (e.g. 120 Hz), the viewer will not perceive the presence of the calibration pattern. The camera captures each positive and negative frame individually. The projection controller 130 then subtracts the captured negative frame from the captured positive frame, which results in a "subtracted frame". The subtracted frame typically contains the calibration marks, with the projected content substantially removed. Due to camera sensor noise, lighting variation, etc., the subtracted frame may contain noise, and the calibration marks in the captured frame may be of reduced intensity compared with the projected calibration marks. The subtracted frame is then processed by the projection controller 130.

Figure 3B:
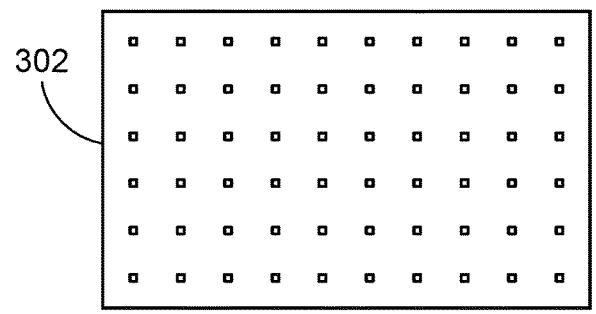
FIG. 3B shows an example of a calibration pattern corresponding to the calibration pattern of FIG. 3A, in which the calibration marks are added to a projector image.

FIG. 3B shows a representation 302 of calibration pattern 301, where the calibration marks are added to the projected content, to project a positive frame. Each mark in a positive frame has a corresponding mark in a negative frame.

Figure 3C:
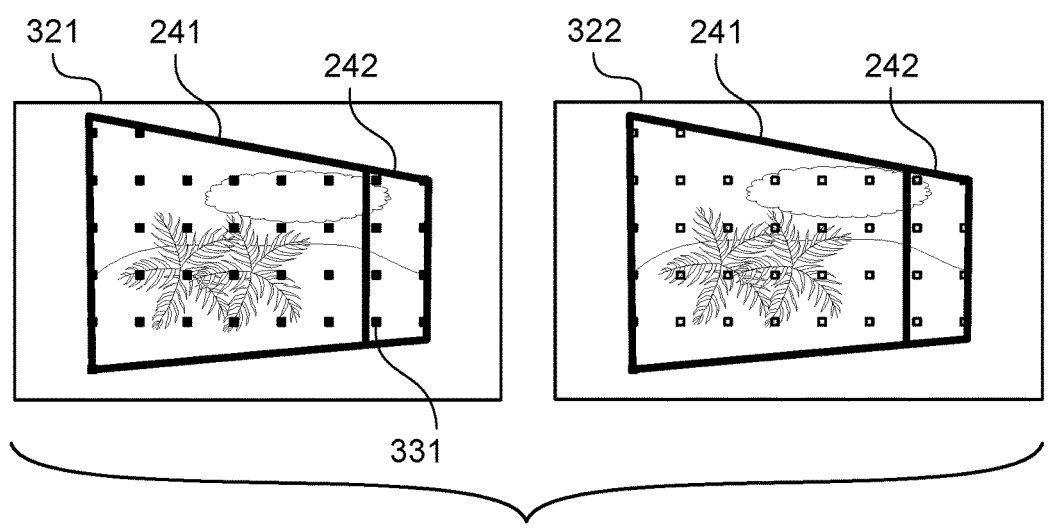
FIG. 3C shows an example of a negative frame and a positive frame, each consisting of a projector image and an embedded calibration pattern.

FIG. 3C shows an example of a negative frame 321 and a positive frame 322. Negative frame 321 consists of the calibration pattern 301 subtracted from the projector image 231, thereby showing the calibration pattern at reduced intensity (darker). Positive frame 322 consists of the calibration pattern 301 added to the projector image 231, thereby showing the calibration pattern at increased intensity (brighter). Preferably, the calibration marks are only subtracted or added where a portion of the content image 200 is displayed (e.g. within portions 241 or 242).

Preferably, a calibration pattern is projected by each projector in sequence, notwithstanding that the projectors are synchronised to display the same source content simultaneously. For example, for sequential display of the calibration pattern, the left-side projector 111 may first project the calibration pattern, consisting of the negative frame 301 followed by the positive frame 302. Then, the right-side projector 112 may project the calibration pattern, again consisting of the negative frame 301 followed by the positive frame 302. Note that some projectors are configured to display the source images at double the frame rate. For example, 60 Hz frames may be reproduced as 120 Hz frames, essentially displaying each source frame twice. This affords, according to the present disclosure, the reproduction by any one projector of sequence of a positive frame and a negative frame in the period in which a single frame would be traditionally reproduced. An image of each projected calibration pattern is produced by one or more cameras. For example, a calibration pattern projected by the left-side projector 111 may be captured by both the left-side camera 121 and the right-side camera 122.

FIG. 4: Example of Capture, Subtraction

Figure 4A:
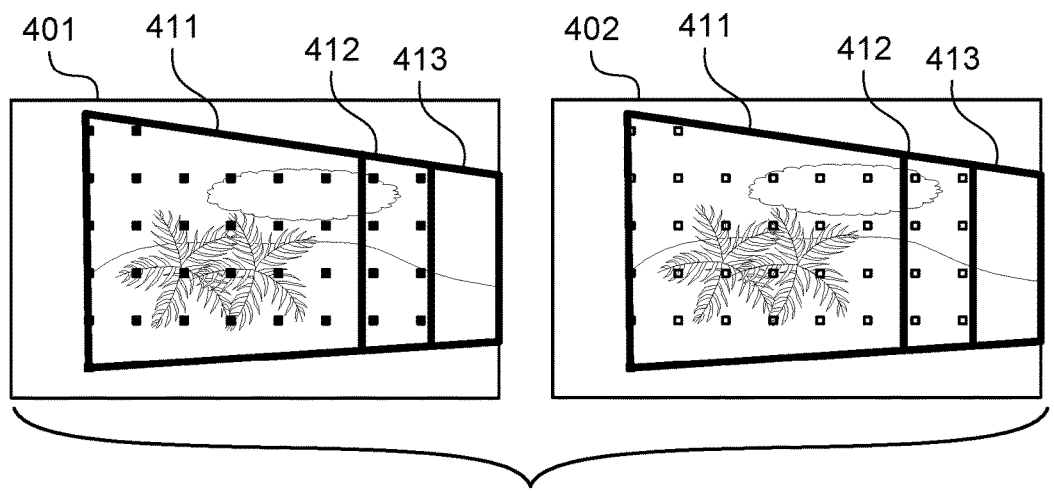
FIG. 4A shows an example of a captured negative frame and a captured positive frame, captured by a camera within the multi-projector system shown in FIG. 1.

FIG. 4A shows an example of a captured negative frame 401 and a captured positive frame 402, representing a temporal variation of the calibration pattern. In the example shown in FIG. 4A, captured frames 401 and 402 are captured by the left-side camera 121, and are received by the projection controller 130. Each captured frame 401 and 402 contains three regions: a region 411 that is projected with the left-side projector 111 only, a region 412 that is projected with both projectors 111 and 112 (the blend region), and a region 413 that is projected with the right-side projector 112 only. Since only the left-side projector 111 is projecting a calibration pattern, the captured frames contain calibration marks in only regions 411 and 412 that are projected with the left-side projector 111. The captured negative frame 401 contains regions of the content image 200 with the calibration marks subtracted. The captured positive frame 402 contains regions of the content image 200 with the calibration marks added.

Figure 4B:
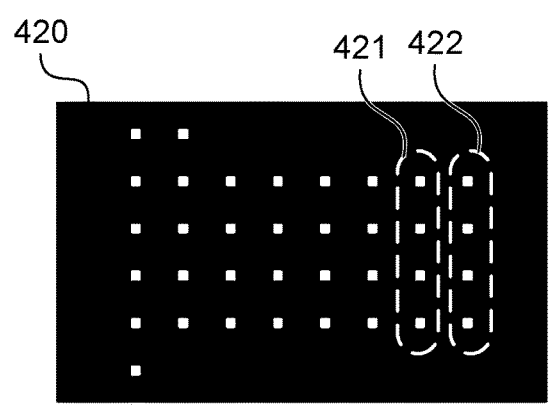
FIG. 4B shows an example of a subtracted frame, formed by subtracting a captured negative frame from a captured positive frame.

FIG. 4B shows an example of a subtracted frame 420. A subtracted frame 420 is created by the projection controller 130 by subtracting the captured negative frame 401 from the captured positive frame 402. The subtracted frame 420 therefore contains calibration marks of the calibration pattern 301, perhaps with reduced intensity compared with the projected calibration pattern. The subtracted frame 420 may also contain noise, as described previously, which may dominate the background of the frame 420 and which is of comparatively substantially reduced intensity, represented in FIG. 4B by black shading.

It is desired to increase the detectability of the calibration marks in captured negative frames and captured positive frames, and thereby increase the intensity or contrast of the calibration marks in a subtracted frame. A calibration mark has high detectability if it has a high intensity, and a high contrast relative to the surrounding parts of the image. In regions that are only projected with the projector that is projecting the calibration pattern, such as region 411 when the left-side projector 111 is performing calibration, calibration marks will have high detectability. However, in regions that are also projected with other projectors, there is additional light being projected onto the surface at the location of the calibration marks. The additional light reduces the contrast of the calibration marks, in comparison with the surrounding region. Therefore, the calibration marks in regions that are also projected with other projectors, for example, region 412, will have reduced and typically low detectability.

As described earlier, a blend region is projected by two or more projectors. The contribution of each projector projecting in the blend region is lowered, so that the overall intensity in the blend region is equivalent to the intensity of a single projection. This lowering of intensity also lowers the intensity of the projected calibration marks. Calibration marks 421 and 422 seen in FIG. 4B were embedded in the blend region 412 of the projected content image. Therefore, calibration marks 421 and 422 will typically have low detectability.

FIG. 5: Reduced Detectability of Marks

Figure 5A:
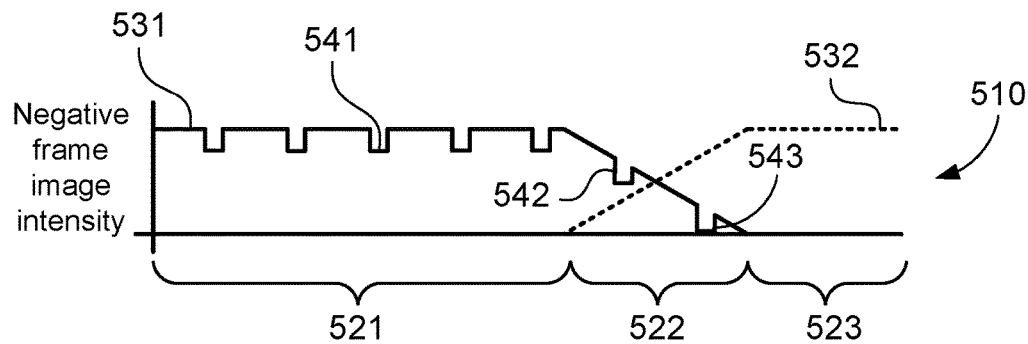
FIGS. 5A to 5C show a further example of creating a subtracted frame using a captured negative frame and a captured positive frame, and the reduced detectability of calibration marks in a blend region.
Figure 5B:
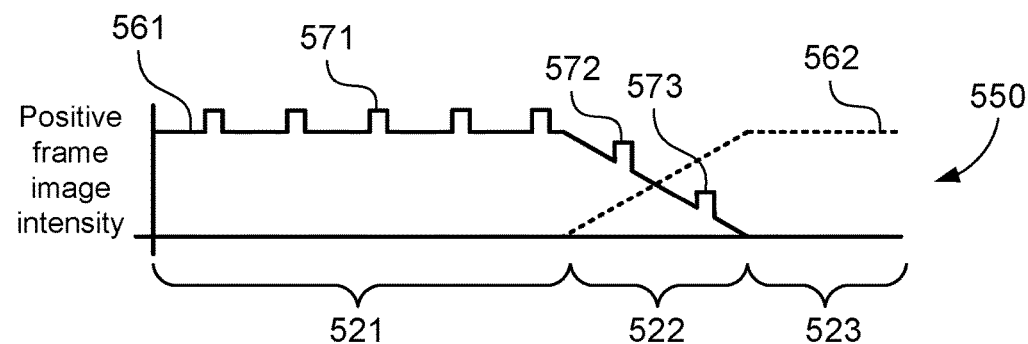
Figure 5C:
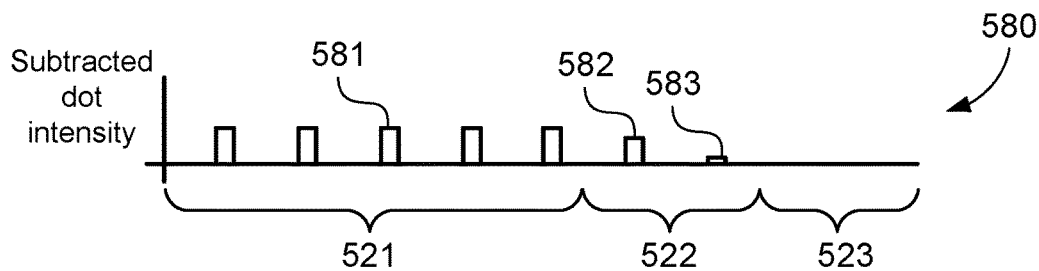

FIGS. 5A to 5C show a further example of creating a subtracted frame, and the detectability of calibration marks in the subtracted frame. FIG. 5A shows a graph representation 510 of a projected or captured negative frame, for example, the captured negative frame 401. The representation 510 shows image intensity (vertical axis) as a function of horizontal position (horizontal axis). The intensity of the contribution of the left-side projector 111 is represented by the solid line 531. The intensity of the contribution of the right-side projector 112 is represented by the dashed line 532. The region 411 that contains contribution of the left-side projector 111 only is represented by the portion 521 of the horizontal axis. The region 412 that contains contribution of both projectors 111 and 112 (the blend region) is represented by the portion 522 of the horizontal axis. The region 413 that contains contribution of the right-side projector 112 only is represented by the portion 523 of the horizontal axis.

The intensity 531 of the left-side projector 111 is shown as containing calibration marks (e.g. calibration marks 541-543) at discrete positions, for the projected or captured negative frame 510. For example, calibration mark 541 is subtracted from the intensity of the content image in a negative frame (e.g. frame 401).

FIG. 5B shows a representation 550 of a projected or captured positive frame, for example, the captured positive frame 402. The intensity of the contribution of the left-side projector 111 is represented by the solid line 561. The intensity of the contribution of the right-side projector 112 is represented by the dashed line 562.

The intensity 561 of the left-side projector 111 is shown as containing calibration marks (e.g. 571-573) at discrete positions, for the projected or captured positive frame 550. For example, calibration mark 571 is added to the intensity of the content image in a positive frame (e.g. frame 402).

Calibration mark 571 is located at the same position as calibration mark 541. As discussed earlier, positive and negative frames are projected (and captured) consecutively. Calibration marks 541 and 571 are positioned within the region represented by portion 521, where there is contribution from only the left-side projector 111. Calibration marks 542, 543, 572 and 573 are positioned within the blend region represented by portion 552, where there is contribution from both the left-side projector 111 and the right-side projector 112.

FIG. 5C shows a subtracted frame 580, which contains only calibration marks. As discussed earlier, a subtracted frame is created by the projection controller 130 by subtracting a negative frame from a positive frame. In the example shown in FIG. 5A to 5C, the subtracted frame 580 is created by subtracting the captured negative frame 510 of FIG. 5A from the captured positive frame 550 of FIG. 5B.

Subtracting the negative frame of FIG. 5A from the positive frame of FIG. 5B will leave only calibration marks such as the calibration mark 581 since the intensity 531 of the left projector in the negative frame and the intensity 561 of the left projector in the positive frame are the same. Thus the typical subtracted intensity of FIG. 5C of the calibration mark 581 has a magnitude approximately twice the magnitude of the calibration marks 541 and 571.

Within the region 411 of the subtracted frame that contains contribution of the left-side projector 111 only (represented by the portion 521), the calibration marks have high intensity (detectability). For example, the calibration mark 581 has high detectability. However, and in contrast, within the region 412 that contains contribution of both projectors 111 and 112 (the blend region, represented by the portion 522), the calibration marks 582-583 have lower intensity (detectability). This is because the contribution of the left-side projector 111 that is projecting the calibration pattern is reduced, and the contribution of the right-side projector 112 is increased. The detectability of the calibration marks 582-583 is therefore generally low. Calibration mark 582 corresponds to calibration marks 421 in the subtracted image 420 described previously with reference to FIG. 4B. Similarly, calibration mark 583 corresponds to calibration marks 422 in the subtracted image 420.

The relative contribution of the left-side projector 111 and the right-side projector 112 can be observed in the representations of the captured positive and negative frames 510 and 550. The detectability of calibration mark 582 is only slightly reduced, since the contribution of the left-side projector 111 at the position of the calibration mark 582 is still fairly high, relative to the contribution of the right-side projector. However, the detectability of calibration mark 583 is very low, since the contribution of the left-side projector 111 at the position of the calibration mark 583 is very low, and the contribution of the right-side projector 112 at the same position is very high.

It is therefore desirable to increase the detectability of calibration marks, particularly in regions of overlap between multiple projectors.

Overview

The arrangements presently disclosed increase the detectability of calibration marks in regions of overlap (interference) between multiple projectors. More specifically, compensation masks are created at the locations of calibration marks, and are used to increase the contribution (intensity) of the projector that is projecting the calibration pattern. In addition, compensation masks are created at corresponding locations in overlapping projections, and are used to decrease the contribution (intensity) of those projections in the vicinity of the calibration marks. The compensation masks are created in such a way as to minimise their perceptibility in the event the projectors are slightly misaligned.

First Arrangement

Figure 6:
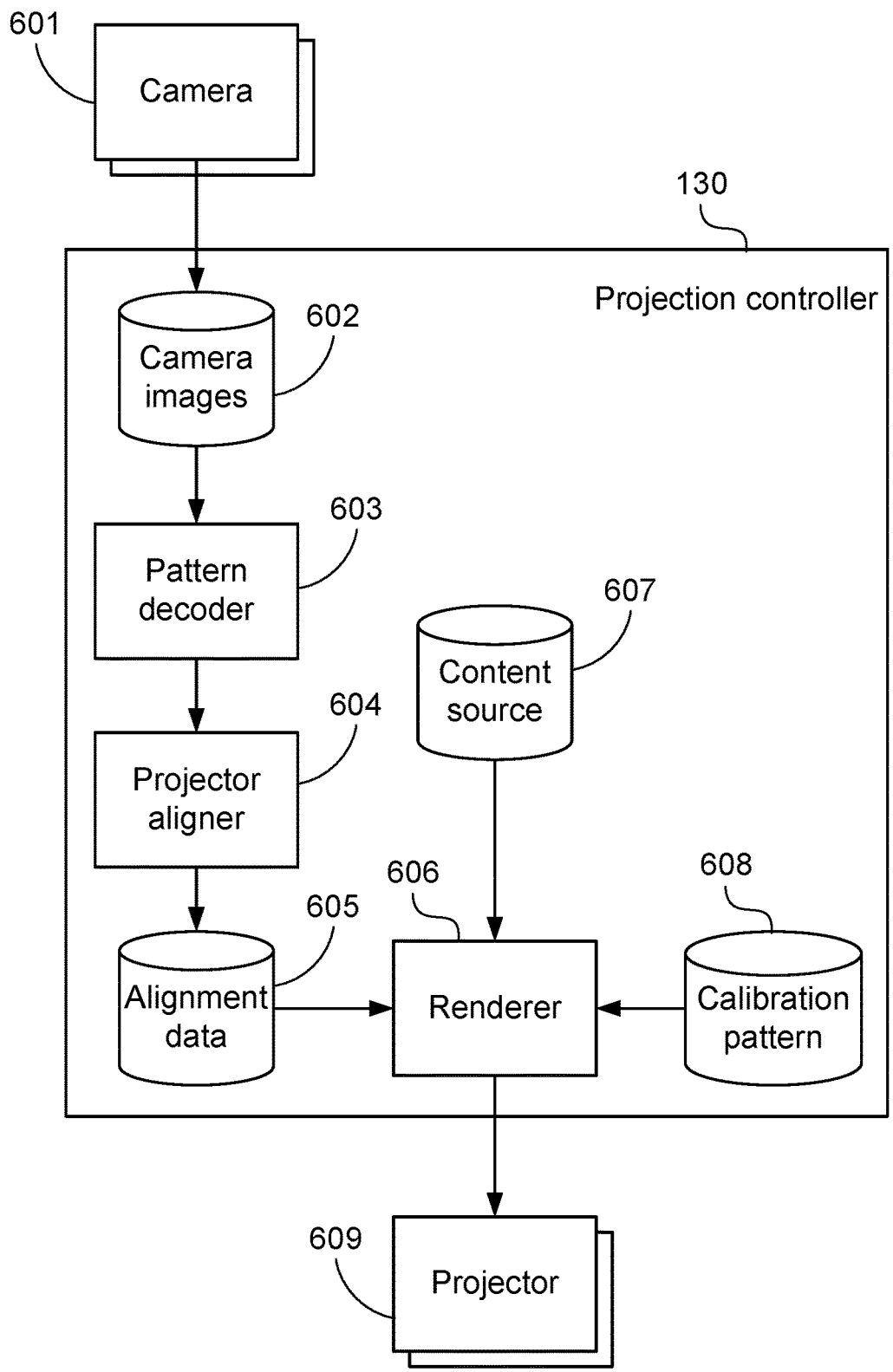
FIG. 6 is a schematic block diagram of an exemplary projection controller according to the present disclosure.

FIG. 6: Module Diagram

FIG. 6 shows a schematic block diagram of a preferred form of the projection controller 130. The projection controller 130 receives captured images of projected calibration patterns from one or more cameras 601 (e.g. cameras 121 and 122). The projection controller 130 stores the captured camera images 602.

A pattern decoder 603 retrieves a negative frame and a corresponding positive frame from the stored camera images 602, and creates a subtracted frame, as described previously with respect to FIGS. 5A to 5C. The pattern decoder 603 then decodes the calibration pattern in the subtracted frame to determine correspondences between positions in the subtracted frame and positions in the projected image. The decoding method depends on the specific calibration pattern used. If for example, the calibration pattern consists of a regular grid of dots, as described previously with reference to FIG. 3A, the pattern decoder 603 may analyse the position of each dot, and perhaps the colour and shape of each dot. Once each dot is identified, the corresponding position in the projected image will be known. Other calibration patterns require different decoding methods. For example, a Gray code calibration pattern, well known in the art, requires a sequence of frames to be projected and captured. Each frame in the sequence encodes a specific bit within each position of the projected image. The bits are merged over the sequence of frames, resulting in absolute positions in the projected image. Many other calibration patterns and decoding methods are possible and may be used within the scope of the present disclosure. For example, a pattern of random dots may provide high alignment accuracy through the use of correlation methods, generally known in the art.

A projector aligner 604 receives the correspondences formed by the pattern decoder 603, and determines which portions of the content image should be displayed by each projector 609, and where in each projector image those portions should be displayed, to achieve precise alignment between the multiple projectors. For example, referring to FIG. 2B, the projector aligner 604 determines that the projector image 231 of the left-side projector 111 should display the left-side portion of the content image 200, within the boundaries of regions 241 and 242 of the projector image 231. Similarly, the projector aligner 604 determines that the projector image 232 of the right-side projector 112 should display the right-side portion of the content image 200, within the boundaries of regions 243 and 244 of the projector image 232.

The projector aligner 604 may perform alignment using any method known in the art. For example, the projector aligner 604 may first use the correspondences formed by the pattern decoder 603 to triangulate and create a point cloud representation of the projection surface. The relative pose of each projector can then be determined, and the point clouds corresponding to the multiple projectors can be combined. The projector aligner 604 can then determine a region, on the surface of the point cloud that is within the maximum projection area, which is upright, and has the same aspect ratio as the content image to be displayed. Finally, the region can be divided into several portions, to be displayed using the multiple projectors.

Several other known methods of performing alignment of multiple projectors are possible and within the scope of the present disclosure. For example, if the projection surface is planar, the projector aligner 604 can use the correspondences formed by the pattern decoder 603 to determine, for each projector, a homography mapping the projector image to the surface. A homography, well known in the art, defines a mapping between two 2-dimensional planes, and can be used to determine the corresponding surface location for each projector image location. Once a homography has been determined for each projector, the projection regions can be determined on the surface, as described above. The projector regions can then be mapped back to each projector using the inverse of the determined homographies.

The projector aligner 604 stores alignment data 605, including the portions of the content image to be displayed by each projector, where in each projector image those portions should be displayed, and how each portion is to be blended, if the portion is within a blend region.

A renderer 606 receives the alignment data 605 and creates the projector image for each projector 609. The renderer 606 retrieves the next content image from a content source 607. The content source 607 may be a static image, a video, or any other form of content. The frame rate of the content images is preferably lower than the frame rate of the projectors and cameras. The renderer 606 renders the relevant portions of the content image within the regions defined by the alignment data, for each projector image. The renderer 606 then retrieves a calibration pattern 608, and embeds the calibration pattern 608 into the projector image, as described previously with reference to FIG. 3C. If the next frame to be rendered is a negative frame, the calibration pattern 608 is subtracted from the projector image. If the next frame to be rendered is a positive frame, the calibration pattern 608 is added to the projector image. The renderer 606 also applies a compensation to one or more of the projectors to increase the detectability of the calibration pattern by the cameras 601. The operation of the renderer 606 is described in more detail later with reference to FIG. 7-14B.

Finally, the renderer 606 sends the projector images to the projectors 609 (e.g. projectors 111 and 112) to be displayed on the projector surface (e.g. projection surface 160).

Figure 15A:
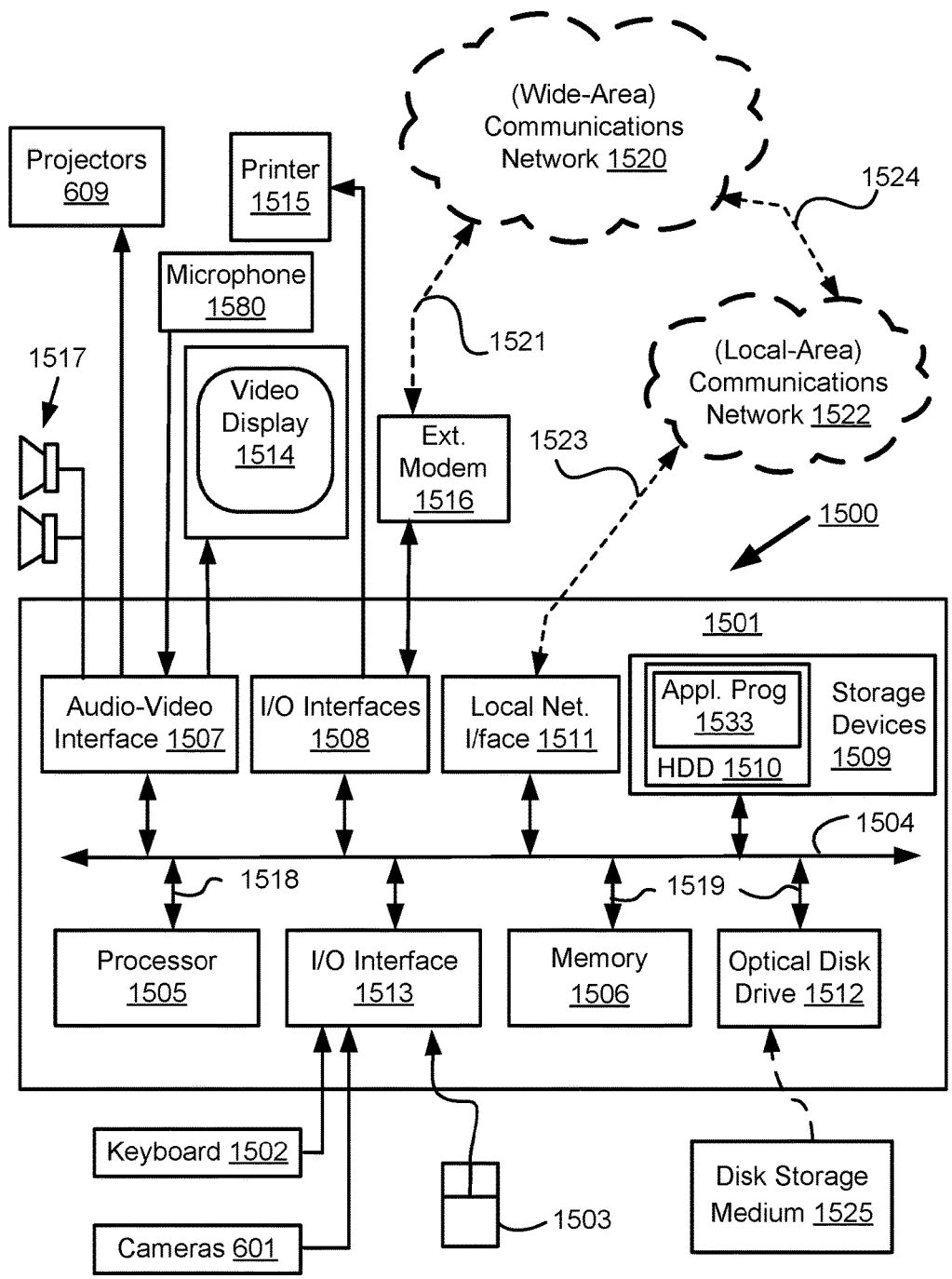
FIGS. 15A and 15B form a schematic block diagram of a general purpose computer system upon which arrangements described can be practiced.
Figure 15B:
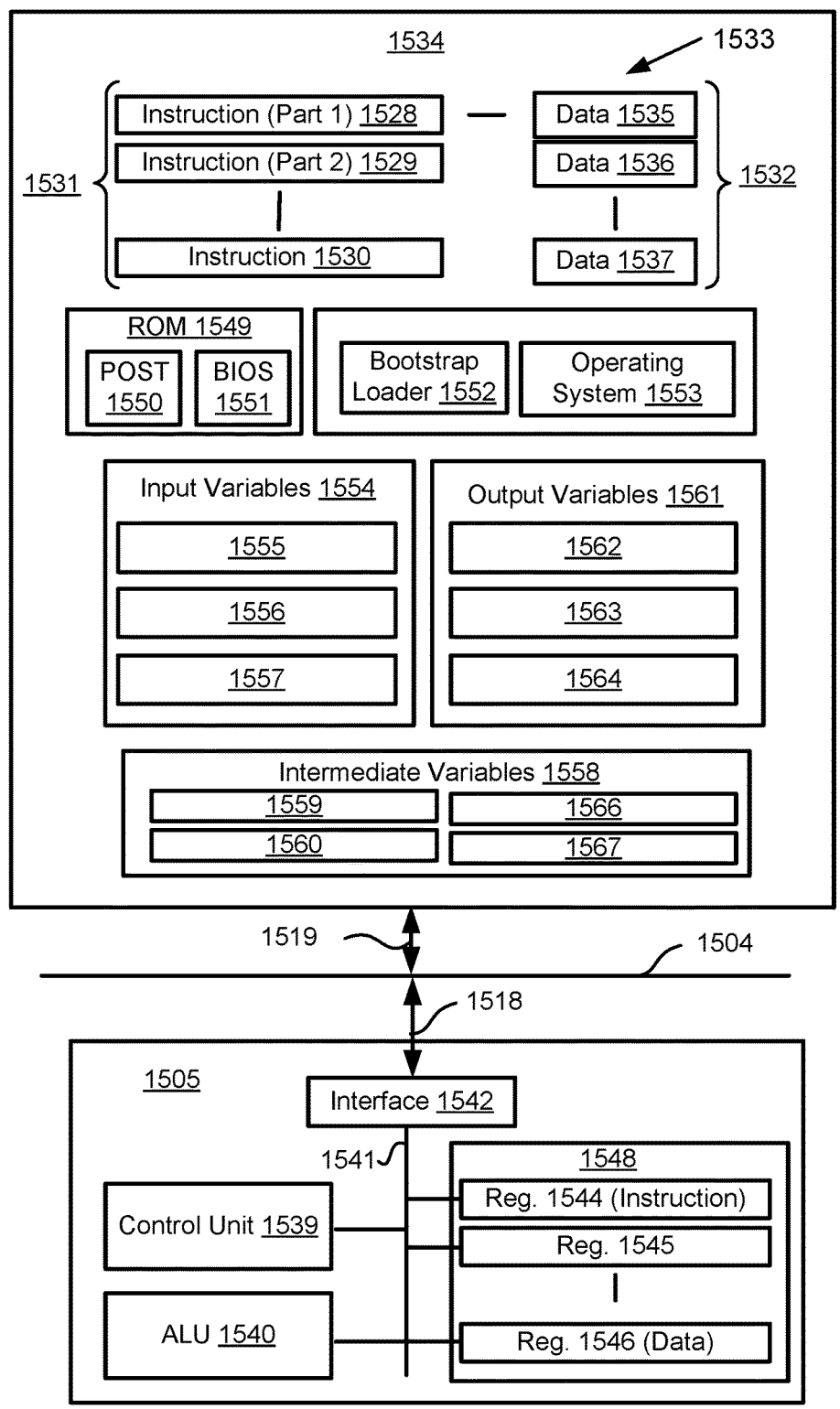

FIGS. 15A and 15B: Computer Implementation

FIGS. 15A and 15B depict a general-purpose computer system 1500, upon which the various arrangements described can be practiced, and specifically by which the projection controller 130 may be implemented, typically via a software implementation.

As seen in FIG. 15A, the computer system 1500 includes: a computer module 1501; input devices such as a keyboard 1502, a mouse pointer device 1503, the cameras 601, and a microphone 1580; and output devices including a printer 1515, a display device 1514, loudspeakers 1517, and the projectors 609. An external Modulator-Demodulator (Modem) transceiver device 1516 may be used by the computer module 1501 for communicating to and from a communications network 1520 via a connection 1521. The communications network 1520 may be a wide-area network (WAN), such as the Internet, a cellular telecommunications network, or a private WAN. Where the connection 1521 is a telephone line, the modem 1516 may be a traditional "dial-up" modem. Alternatively, where the connection 1521 is a high capacity (e.g., cable) connection, the modem 1516 may be a broadband modem. A wireless modem may also be used for wireless connection to the communications network 1520.

The computer module 1501 typically includes at least one processor unit 1505, and a memory unit 1506. For example, the memory unit 1506 may have semiconductor random access memory (RAM) and semiconductor read only memory (ROM). The computer module 1501 also includes an number of input/output (I/O) interfaces including: an audio-video interface 1507 that couples to the video display 1514, the projectors 609, loudspeakers 1517 and microphone 1580; an I/O interface 1513 that couples to the keyboard 1502, mouse 1503, cameras 601, and optionally a joystick or other human interface device (not illustrated); and an interface 1508 for the external modem 1516 and printer 1515. In some implementations, the modem 1516 may be incorporated within the computer module 1501, for example within the interface 1508. The computer module 1501 also has a local network interface 1511, which permits coupling of the computer system 1500 via a connection 1523 to a local-area communications network 1522, known as a Local Area Network (LAN). As illustrated in FIG. 15A, the local communications network 1522 may also couple to the wide network 1520 via a connection 1524, which would typically include a so-called "firewall" device or device of similar functionality. The local network interface 1511 may comprise an Ethernet circuit card, a Bluetooth™ wireless arrangement or an IEEE 802.11 wireless arrangement; however, numerous other types of interfaces may be practiced for the interface 1511.

The I/O interfaces 1508 and 1513 may afford either or both of serial and parallel connectivity, the former typically being implemented according to the Universal Serial Bus (USB) standards and having corresponding USB connectors (not illustrated). Storage devices 1509 are provided and typically include a hard disk drive (HDD) 1510. Other storage devices such as a floppy disk drive and a magnetic tape drive (not illustrated) may also be used. An optical disk drive 1512 is typically provided to act as a non-volatile source of data. Portable memory devices, such optical disks (e.g., CD-ROM, DVD, Blu-ray Disc™), USB-RAM, portable, external hard drives, and floppy disks, for example, may be used as appropriate sources of data to the system 1500.

The components 1505 to 1513 of the computer module 1501 typically communicate via an interconnected bus 1504 and in a manner that results in a conventional mode of operation of the computer system 1500 known to those in the relevant art. For example, the processor 1505 is coupled to the system bus 1504 using a connection 1518. Likewise, the memory 1506 and optical disk drive 1512 are coupled to the system bus 1504 by connections 1519. Examples of computers on which the described arrangements can be practised include IBM-PC's and compatibles, Sun Sparestations, Apple Mac™ or a like computer systems.

The methods of multiple projector display may be implemented using the computer system 1500 wherein the processes of FIGS. 7 to 14B, to be described, may be implemented as one or more software application programs 1533 executable within the computer system 1500. In particular, the steps of the projection methods are effected by instructions 1531 (see FIG. 15B) in the software 1533 that are carried out within the computer system 1500. The software instructions 1531 may be formed as one or more code modules, each for performing one or more particular tasks. The software may also be divided into two separate parts, in which a first part and the corresponding code modules performs the projection methods and a second part and the corresponding code modules manage a user interface between the first part and the user.

The software may be stored in a computer readable storage medium, including the storage devices described below, for example. The software is loaded into the computer system 1500 from the computer readable medium, and then executed by the computer system 1500. A computer readable medium having such software or computer program recorded on the computer readable medium is a computer program product. The use of the computer program product in the computer system 1500 preferably effects an advantageous apparatus for multiple projector reproduction of images.

The software 1533 is typically stored in the HDD 1510 or the memory 1506. The software is loaded into the computer system 1500 from a computer readable medium, and executed by the computer system 1500. Thus, for example, the software 1533 may be stored on an optically readable disk storage medium (e.g., CD-ROM) 1525 that is read by the optical disk drive 1512. A computer readable storage medium having such software or computer program recorded on it is a computer program product. The use of the computer program product in the computer system 1500 preferably effects an apparatus for projection of image content via multiple projectors.

In some instances, the application programs 1533 may be supplied to the user encoded on one or more CD-ROMs 1525 and read via the corresponding drive 1512, or alternatively may be read by the user from the networks 1520 or 1522. Still further, the software can also be loaded into the computer system 1500 from other computer readable media. Computer readable storage media refers to any non-transitory tangible storage medium that provides recorded instructions and/or data to the computer system 1500 for execution and/or processing. Examples of such storage media include floppy disks, magnetic tape, CD-ROM, DVD, Blu-ray Disc™, a hard disk drive, a ROM or integrated circuit, USB memory, a magneto-optical disk, or a computer readable card such as a PCMCIA card and the like, whether or not such devices are internal or external of the computer module 1501. Examples of transitory or non-tangible computer readable transmission media that may also participate in the provision of software, application programs, instructions and/or data to the computer module 1501 include radio or infra-red transmission channels as well as a network connection to another computer or networked device, and the Internet or Intranets including e-mail transmissions and information recorded on Websites and the like.

The second part of the application programs 1533 and the corresponding code modules mentioned above may be executed to implement one or more graphical user interfaces (GUIs) to be rendered or otherwise represented upon the display 1514. Through manipulation of typically the keyboard 1502 and the mouse 1503, a user of the computer system 1500 and the application may manipulate the GUI in a functionally adaptable manner to provide controlling commands and/or input to the applications associated with the GUI(s) to achieve a desired mode of operation and reproduction of desired content via the projectors 609. Other forms of functionally adaptable user interfaces may also be implemented, such as an audio interface utilizing speech prompts output via the loudspeakers 1517 and user voice commands input via the microphone 1580.

FIG. 15B is a detailed schematic block diagram of the processor 1505 and a "memory" 1534. The memory 1534 represents a logical aggregation of all the memory modules (including the HDD 1509 and semiconductor memory 1506) that can be accessed by the computer module 1501 in FIG. 15A.

When the computer module 1501 is initially powered up, a power-on self-test (POST) program 1550 executes. The POST program 1550 is typically stored in a ROM 1549 of the semiconductor memory 1506 of FIG. 15A. A hardware device such as the ROM 1549 storing software is sometimes referred to as firmware. The POST program 1550 examines hardware within the computer module 1501 to ensure proper functioning and typically checks the processor 1505, the memory 1534 (1509, 1506), and a basic input-output systems software (BIOS) module 1551, also typically stored in the ROM 1549, for correct operation. Once the POST program 1550 has run successfully, the BIOS 1551 activates the hard disk drive 1510 of FIG. 15A. Activation of the hard disk drive 1510 causes a bootstrap loader program 1552 that is resident on the hard disk drive 1510 to execute via the processor 1505. This loads an operating system 1553 into the RAM memory 1506, upon which the operating system 1553 commences operation. The operating system 1553 is a system level application, executable by the processor 1505, to fulfil various high level functions, including processor management, memory management, device management, storage management, software application interface, and generic user interface.

The operating system 1553 manages the memory 1534 (1509, 1506) to ensure that each process or application running on the computer module 1501 has sufficient memory in which to execute without colliding with memory allocated to another process. Furthermore, the different types of memory available in the system 1500 of FIG. 15A must be used properly so that each process can run effectively. Accordingly, the aggregated memory 1534 is not intended to illustrate how particular segments of memory are allocated (unless otherwise stated), but rather to provide a general view of the memory accessible by the computer system 1500 and how such is used.

As shown in FIG. 15B, the processor 1505 includes a number of functional modules including a control unit 1539, an arithmetic logic unit (ALU) 1540, and a local or internal memory 1548, sometimes called a cache memory. The cache memory 1548 typically includes a number of storage registers 1544-1546 in a register section. One or more internal busses 1541 functionally interconnect these functional modules. The processor 1505 typically also has one or more interfaces 1542 for communicating with external devices via the system bus 1504, using a connection 1518. The memory 1534 is coupled to the bus 1504 using a connection 1519.

The application program 1533 includes a sequence of instructions 1531 that may include conditional branch and loop instructions. The program 1533 may also include data 1532 which is used in execution of the program 1533. The instructions 1531 and the data 1532 are stored in memory locations 1528, 1529, 1530 and 1535, 1536, 1537, respectively. Depending upon the relative size of the instructions 1531 and the memory locations 1528-1530, a particular instruction may be stored in a single memory location as depicted by the instruction shown in the memory location 1530. Alternately, an instruction may be segmented into a number of parts each of which is stored in a separate memory location, as depicted by the instruction segments shown in the memory locations 1528 and 1529.

In general, the processor 1505 is given a set of instructions which are executed therein. The processor 1505 waits for a subsequent input, to which the processor 1505 reacts to by executing another set of instructions. Each input may be provided from one or more of a number of sources, including data generated by one or more of the input devices 1502, 1503, data received from an external source across one of the networks 1520, 1522, data retrieved from one of the storage devices 1506, 1509 or data retrieved from a storage medium 1525 inserted into the corresponding reader 1512, all depicted in FIG. 15A. The execution of a set of the instructions may in some cases result in output of data. Execution may also involve storing data or variables to the memory 1534.

The disclosed projection arrangements use input variables 1554, which are stored in the memory 1534 in corresponding memory locations 1555, 1556, 1557. The projection arrangements produce output variables 1561, which are stored in the memory 1534 in corresponding memory locations 1562, 1563, 1564. Intermediate variables 1558 may be stored in memory locations 1559, 1560, 1566 and 1567.

Referring to the processor 1505 of FIG. 15B, the registers 1544, 1545, 1546, the arithmetic logic unit (ALU) 1540, and the control unit 1539 work together to perform sequences of micro-operations needed to perform "fetch, decode, and execute" cycles for every instruction in the instruction set making up the program 1533. Each fetch, decode, and execute cycle comprises: (i) a fetch operation, which fetches or reads an instruction 1531 from a memory location 1528, 1529, 1530; (ii) a decode operation in which the control unit 1539 determines which instruction has been fetched; and (iii) an execute operation in which the control unit 1539 and/or the ALU 1540 execute the instruction.

Thereafter, a further fetch, decode, and execute cycle for the next instruction may be executed. Similarly, a store cycle may be performed by which the control unit 1539 stores or writes a value to a memory location 1532.

Each step or sub-process in the processes of FIGS. 7 to 14B is associated with one or more segments of the program 1533 and is performed by the register section 1544, 1545, 1546, the ALU 1540, and the control unit 1539 in the processor 1505 working together to perform the fetch, decode, and execute cycles for every instruction in the instruction set for the noted segments of the program 1533.

In the arrangement of FIG. 15A, the camera images 602, in view of their 'live' nature, are desirably temporarily stored in the memory 1506, and similarly for the alignment data 605. The calibration pattern 608 may typically be stored in the HDD 1510. The content source 607 may be obtained from any one of a number of sources, including static image or video reproduction from the disk medium 1525, HDD 1510, or from either of the networks 1520 and 1522. Further, the content source 607 may be derived from a presentation application, such as Microsoft Powerpoint™, executed by the processor 1505 for typical reproduction upon the display 1514, but also additional reproduction by the projectors 609. The content source 607 accordingly may include temporary storage in the memory 1506.

The methods of multiple projector image reproduction disclosed herein may alternatively be implemented in dedicated hardware such as one or more integrated circuits performing the functions or sub functions of FIG. 6. Such dedicated hardware may include graphic processors, digital signal processors, or one or more microprocessors and associated memories. More specifically, the projection controller 130 may be desirably configured as a stand-alone unit configured to receive content images (content source 607) from any suitable source, such as a computer 1501, a DVD player, a computer network or the like, and which couples to the various cameras 601 and projector 609, and whose operation, either in hardware or software, or both, is particularly configured for operating according to the present disclosure for the multi-projector reproduction of images.

Figure 7:
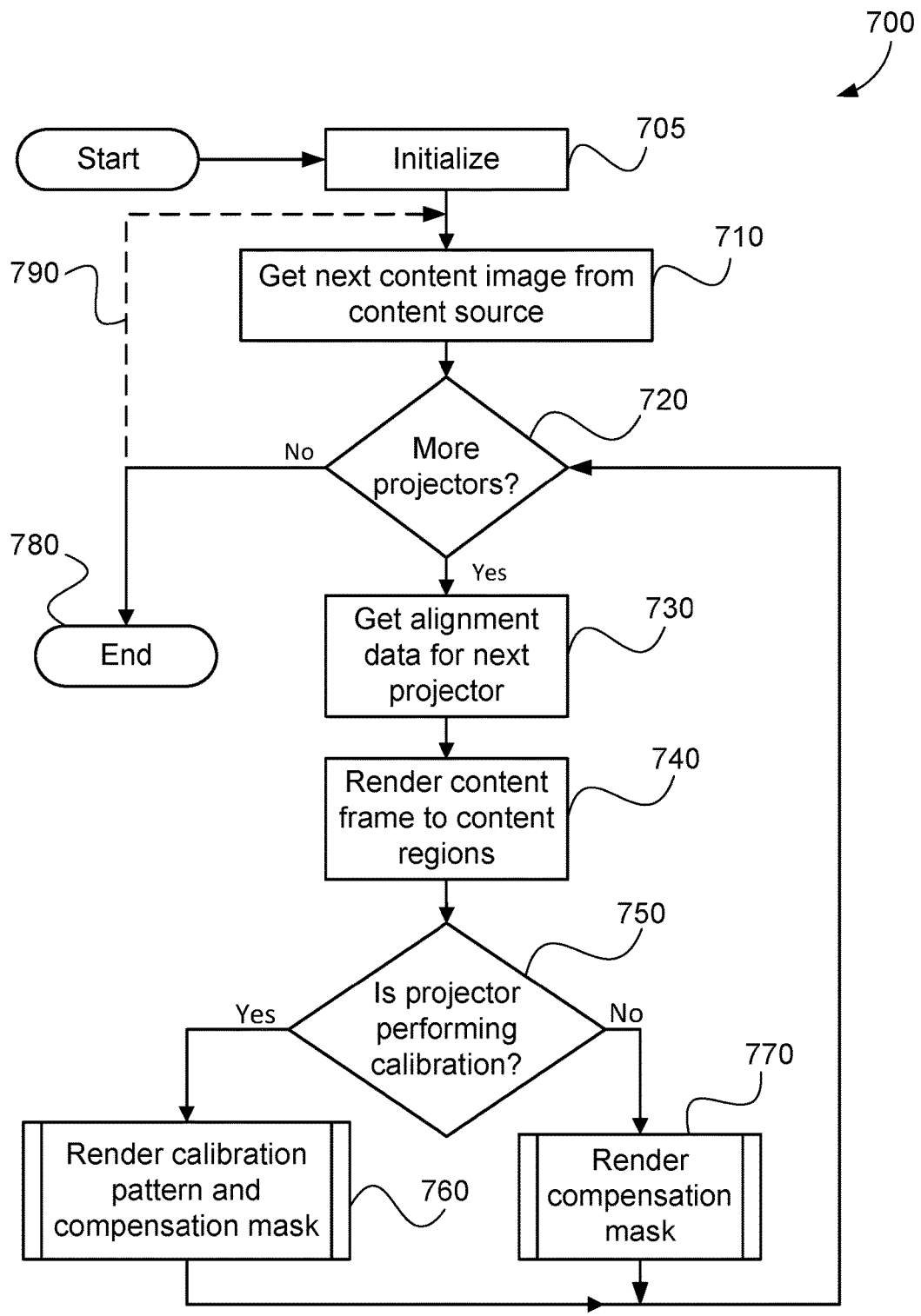
FIG. 7 is a schematic flow diagram illustrating a method of rendering one or more projector images as executed by the renderer module of a projection controller shown in FIG. 6.

FIG. 7: Renderer Flow Diagram

A process 700 of rendering at least two projector images as executed by the renderer 606 will now be described with reference to FIG. 7. The process 700 is preferably implemented by software, for example forming part of the application 1533 and executable by the processor 1505. The process 700 starts with an initialization step 705, where a number of projectors 609 coupled to the projection controller 130 (computer 1501) is determined. Where only one projector is coupled, the arrangements according to the present disclosure are not required and the process would terminate (not illustrated). Typically however, the number of projectors 609 would be at least two and this number is recorded to determine a number of traversals of a processing loop formed by steps 730-770 that applies to each projector. The process 700 then proceeds to step 710, where the processor 1505 retrieves a next content image from the content source 607, such as the HDD 1510. Processing then proceeds to a decision step 720, where the processor 1505 determines if there is another projector for which loop processing is required for a desired projector image to be rendered. Step 720 essentially cycles the processing loop through each projector for each source image.

Where it is determined in step 720 that there are more projectors that require a projector image to be rendered, process 700 proceeds to step 730, where alignment data 605 is retrieved by the processor 1505 from the memory 1506 for the next projector. As described previously, alignment data 605 represents those portions of the content image are to be displayed by the projector, where in the projector image those portions should be displayed, and how each portion is to be blended, if the portion is within a blend region.

Process 700 then proceeds to a rendering step 740, where the content image is rendered, for example by the processor 1505, into the regions of the projector image defined by the alignment data 605. For example, referring to FIG. 2B, the renderer 606 renders the left-side region of the content image 200 to the regions 241 and 242 of the projector image 231. Since the region 242 is to be blended with the projection of the right-side projector 112, a blend function is applied to region 242. Typically, the blend function will reduce the contribution of the left-side projector 111 in a direction from left to right, as shown in the intensities 531 and 561 within the portion 522, in FIG. 5.

Process 700 then proceeds to a decision step 750, where the processor 1505 determines if the current projector is performing calibration. Preferably, each projector performs calibration at a separate time. Each projector may perform calibration at fixed intervals (e.g. every 5 seconds), or when a change to the projector environment is detected (e.g. when one of the projectors is physically moved). When a projector is performing calibration, a calibration pattern is projected by the projector, and the projection is captured by one or more of the cameras 601.

Where it is determined at step 750 that the current projector is performing calibration, process 700 proceeds to step 760, where, under control of the processor 1505, the calibration pattern and compensation mask is rendered to the current projector image. A preferred process 800 of rendering a calibration pattern and compensation mask to a projector image is described in more detail with reference to FIG. 8. Upon completion of step 760, process 700 returns to step 720.

If it is determined at step 750 that the current projector is not performing calibration, process 700 proceeds to step 770, where, under the control of the processor 1505, a compensation mask is rendered to the current projector image. The process 900 of rendering a compensation mask to a projector image is described in more detail with reference to FIG. 9. Upon completion of step 770, process 700 returns to step 720.

On conclusion of step 760 or step 770, the renderer 606 sends the rendered projector images to each of the corresponding projectors 609.

If at decision step 720 it is determined that there are no projectors remaining, process 700 ends at step 780. The ending of the process 700 is applicable for single source content image. Where the source content is an image sequence, such as a video sequence, step 720 can return the process 700 via the dashed connection 790 to step 710 to retrieve the next image of the sequence for multi-projector reproduction.

Figure 8:
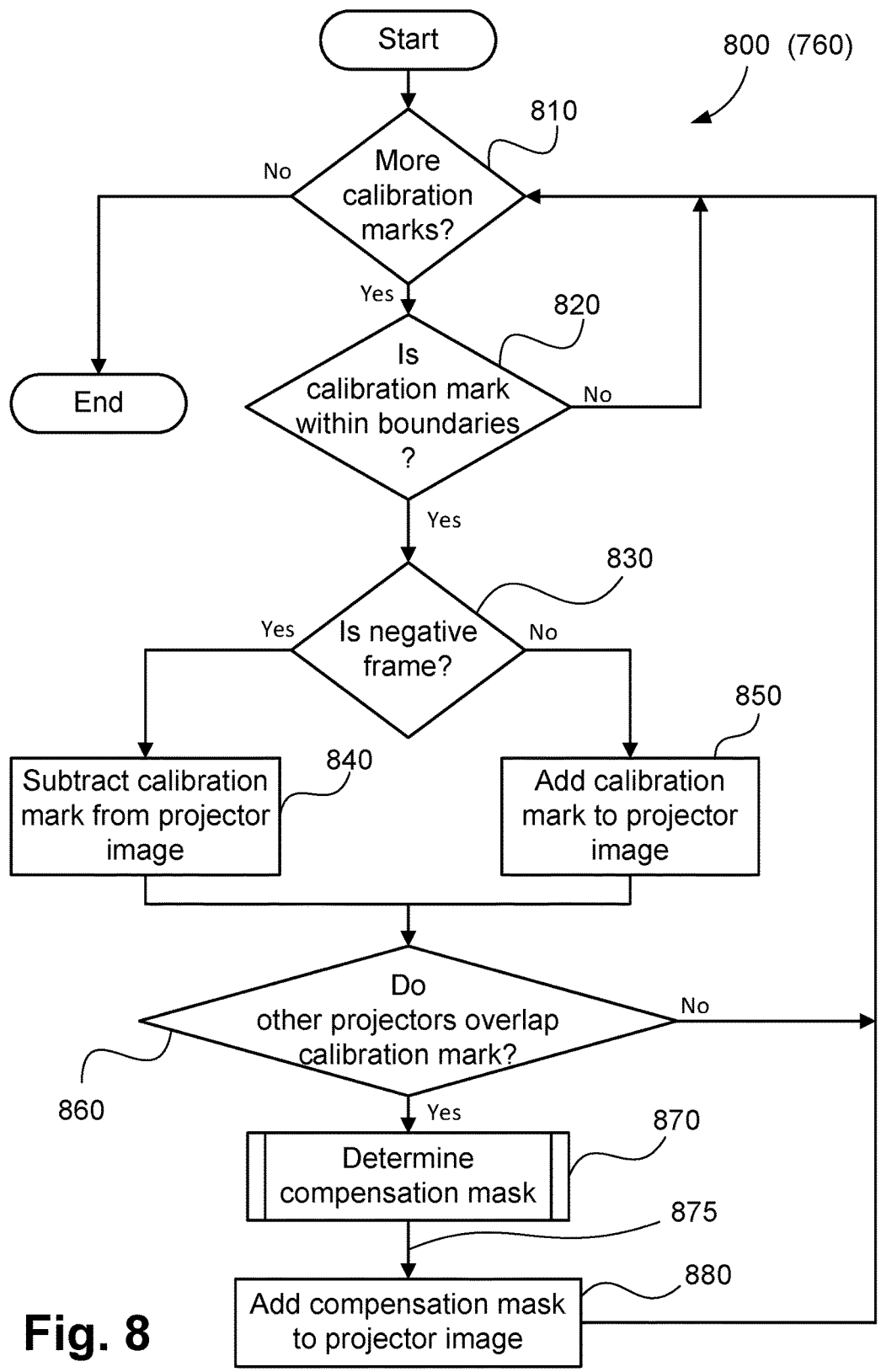
FIG. 8 is a schematic flow diagram illustrating a method of rendering a calibration pattern to a projector image as used in the method of FIG. 7.

FIG. 8: Rendering a Calibration Pattern

A preferred process 800, as executed at step 760 of process 700, of rendering a calibration pattern and compensation mask to a projector image, as executed by the renderer 606, will now be described with reference to FIG. 8. Process 800 is executed by the processor 1505 for a current projector image of a current projector that is currently performing calibration. The process 800 starts and proceeds to decision step 810, where the processor 1505 determines if there are more calibration marks in the calibration pattern remaining to be rendered. As described previously with reference for FIG. 3A, a calibration pattern typically includes several calibration marks. For example, calibration pattern 301, described previously with reference to FIG. 3A, consists of dot-shaped calibration marks, such as calibration mark 310.

If it is determined at step 810 that there are more calibration marks remaining to be rendered, process 800 proceeds to step 820, where the processor 1505 determines if the next calibration mark is within the boundaries of regions of the projector image, as defined by the alignment data 605, as retrieved from the memory 1506. It is preferable that calibration marks are only rendered if they are within the boundaries of the regions of the projector image, and can therefore more easily be made imperceptible. For example, with reference to FIGS. 3A to 3C, calibration mark 310 is determined to not be within the boundaries of regions 241 or 242 of projector image 321, and is therefore not rendered. If it is determined that the next calibration mark is not within the boundaries of the content image in the current projector image (step 820=no), process 800 returns to the decision step 810.

If it is determined at step 820 that the next calibration mark is within the boundaries of the regions of the projector image, process 800 proceeds to a decision step 830, where the processor 1505 determines whether the current projector image is a negative frame. As described earlier, a negative frame is projected, followed by a positive frame, or vice-versa.

If it is determined at step 830 that the frame being rendered is a negative frame, processing proceeds to step 840, where the processor 1505 operates to subtract the calibration mark from the projector image. An example of subtracting a calibration mark from a projector image was described previously with reference to FIG. 4A and FIG. 5A. As shown in the representation 510 of a negative frame, the subtraction of a calibration mark results in a slightly lower (reduced) intensity of the pixels corresponding to the calibration mark. Upon completion of subtraction step 840, process 800 proceeds to step 860.

If it is determined at step 830 that the frame being rendered is not a negative frame (i.e. it is a positive frame), processing proceeds to step 850, where the processor 1505 operates to add the calibration mark to the projector image. An example of adding a calibration mark to a projector image was described previously with reference to FIG. 4A and FIG. 5B. As shown in the representation 550 of a positive frame, the addition of a calibration mark results in a slightly higher (increased) intensity of the pixels corresponding to the calibration mark. Upon completion of addition step 850, process 800 proceeds to step 860.

At decision step 860, the renderer 606 via the processor 1505 determines if there are other projectors overlapping the calibration mark. If there are other projectors overlapping the calibration mark (e.g. in a blend region, such as blend region 223), there will be multiple projectors contributing to the area of the calibration mark, and the intensity of the projector projecting the calibration mark will need to be reduced. Consequently, the detectability of the calibration mark will be reduced. The low detectability of calibration marks in a blend region was described previously with reference to FIG. 5C.

To determine if other projectors overlap a calibration mark at step 860, the renderer 606 determines if the calibration mark is within a region of the projector image that requires blending (as defined by the alignment data 605). For example, with reference to FIG. 3C, calibration mark 331 is within region 242 of the projector image 321. As shown in FIG. 2B, region 242 is overlapped by a region 244 of the projector image 232 of the right-side projector 112, and therefore requires blending.

If it is determined at step 860 that no other projectors overlap the calibration mark, process 800 returns to step 810. Where it is determined at step 860 that other projectors do overlap the calibration mark, process 800 proceeds to step 870, where a compensation mask 875 is determined by the processor 1505 for the calibration mark. The purpose of the compensation mask 875 determined at step 870 is to increase the contribution of the projector 609 in the area surrounding the calibration mark, to improve the detectability of the calibration mark. A preferred process 1000 of determining a compensation mask 875 is described in more detail with reference to FIG. 10.

Process 800 then proceeds to step 880, where the compensation mask 875 is added by operation of the processor 1505 to the projector image at the position of the calibration mark. Adding the compensation mask at this position serves to increase the contribution of the projector that is projecting the calibration mark, and therefore increases the detectability of the calibration mark, as described previously with reference to FIGS. 4A and 4B. Adding the compensation mask 875 at this position also serves to mask compensation masks projected by other projectors, so that the viewer is not able to perceive the presence of the compensation masks. An example of adding a compensation mask to a projector image is described later with reference to FIG. 12.

Upon completion of step 880, process 800 returns to step 810. If at decision step 810 the processor 1805 determines there are no calibration marks remaining, process 800 ends. At this stage, the calibration pattern has been rendered to a projector image, for a projector that is currently performing calibration.

Figure 9:
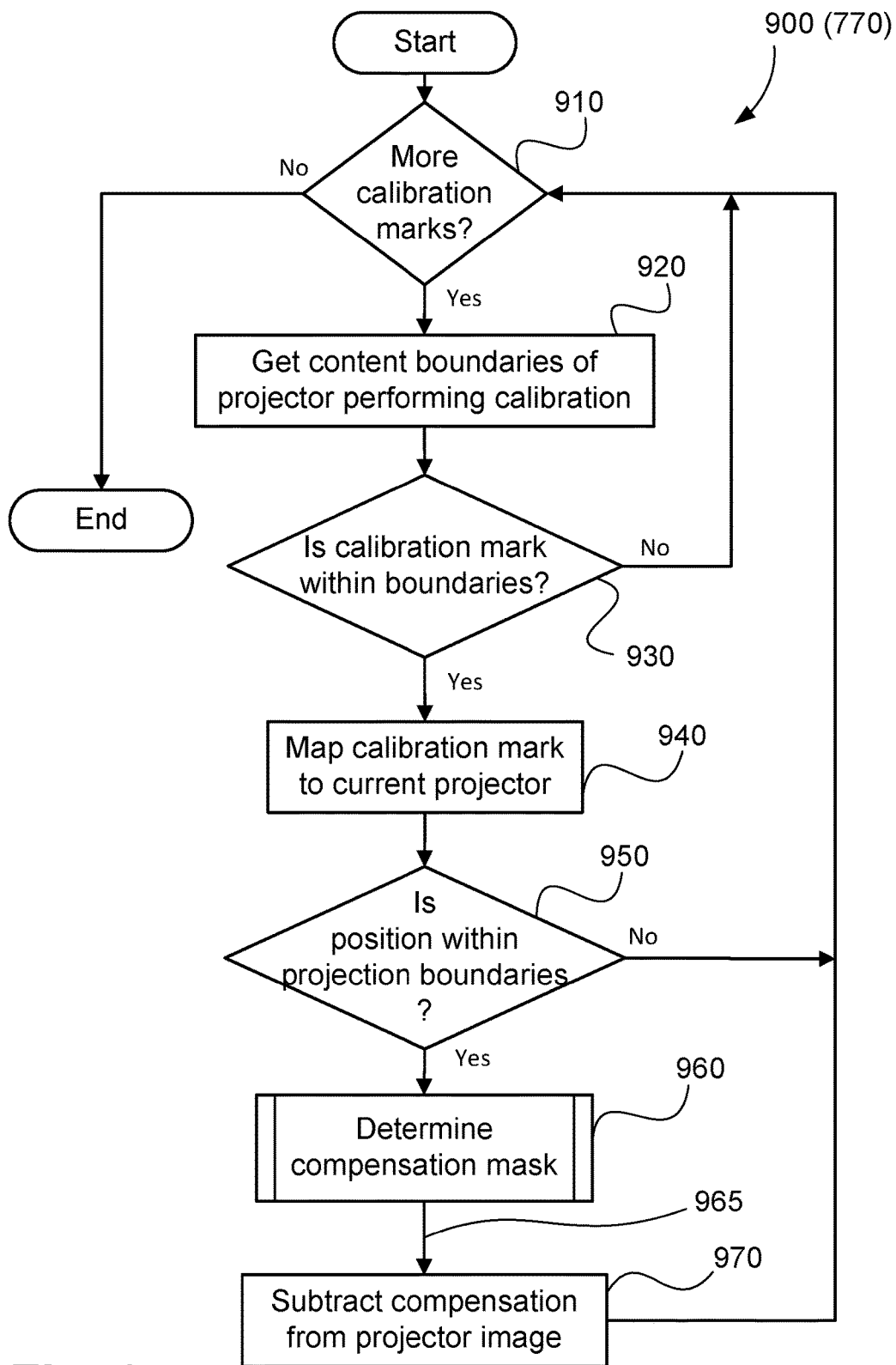
FIG. 9 is a schematic flow diagram illustrating a method of rendering a compensation mask to a projector image as used in the method of FIG. 7.

FIG. 9: Rendering a Compensation Mask

A preferred process 900, as executed at step 770 of process 700 by renderer 606, of rendering a compensation mask to a projector image, for a projector that is not performing calibration, will now be described with reference to FIG. 9. Process 900 is executed for a current projector image of a current projector that is not currently performing calibration. For example, process 900 will be executed for the projector image 232 of the right-side projector 112, if the left-side projector 111 is currently performing calibration. The purpose of rendering a compensation mask, for a projector that is not performing calibration, is to reduce the contribution of that projector in locations of the calibration marks, so that the calibration marks are more detectable.

The process 900 starts and proceeds to decision step 910, where the processor 1505 determines if there are more calibration marks in the calibration pattern remaining for which a compensation mask should be rendered. If it is so determined, process 900 proceeds to step 920, where the processor 1505 operates to determine the boundaries of the content image in the projector performing calibration. These boundaries are part of the alignment data 605. For example, if the left-side projector 111 is performing calibration, at step 920 the renderer 606 determines the boundaries of regions 241 and 242 in the projector image 231.

Process 900 then proceeds to step 930 where the processor 1505 determines if the next calibration mark is within the boundaries determined at step 920. If the next calibration mark is not within the boundaries, it will not be projected by the projector performing calibration, and there is no need for the current projector to project a compensation mask for this calibration mark. If it is determined that the calibration mark is not within the boundaries, process 900 returns to step 910.

If it is determined at step 930 that the calibration mark is within the boundaries, process 900 proceeds to step 940, where the position of the calibration mark is mapped by the processor 1505 to a corresponding mapped position in the projector image for the current projector. The mapping may be stored in the memory 1506. Since the two projectors overlap to some extent, there will be positions in one projector image that have a corresponding position in the other projector images. The mapping between one projector image and another is determined using the alignment data 605. In a preferred implementation, the boundaries of the regions in the projector image to be blended are defined in the alignment data 605. These regions correspond, and therefore can be used to map from one projector image to another. For example, with reference to FIG. 2B, blend region 242 in projector image 231 corresponds to blend region 244 in projector image 232. A mapping between these projector images can be determined by fitting a homography to four or more pairs of corresponding points on the boundaries of two corresponding regions, such as regions 242 and 244. At step 940, the determined homography is used to map the position of the current calibration mark in the projector image of the projector performing calibration (e.g. projector image 231) to a corresponding mapped position in the projector image of the current projector (e.g. projector image 232). Fitting a homography and using the homography for mapping between images is well known in the art.

Process 900 then proceeds to decision step 950, where the processor 1505 executes to determine if the mapped position of the current calibration mark determined in step 940 is within the projection region boundaries of the current projector image. For example, with reference to FIG. 2B, it is determined if the mapped position is within the boundaries of regions 243 or 244 of projector image 232. If the mapped position is not within the boundaries of either of these regions, the compensation mask should not be rendered, thereby preventing the compensation mask from becoming visible to a viewer. If it is determined at step 950 that the mapped position is not within the projection boundaries of the current projector image, process 900 returns to step 910.

Where it is determined at step 950 that the mapped position is within the projection region boundaries, process 900 proceeds to step 960, where a compensation mask is determined for the mapped position. The purpose of the compensation mask is to decrease the contribution of the projector in the region surrounding the mapped position, to improve the detectability of the corresponding calibration mark, which is being projected by another projector performing calibration. The output of step 960 is a compensation mask 965 for the current mapped position. The process 1000 of determining a compensation mask 965 is described in more detail with reference to FIG. 10.

The rendering process 900 then proceeds to step 970, where the compensation mask is subtracted from the projector image at the mapped position by the processor 1505, effectively resulting in a rendering of the compensation mask. Subtracting the compensation mask at this position serves to decrease the contribution of the current projector, and therefore increase the detectability of the corresponding calibration mark projected by some other projector performing calibration. An example of subtracting a compensation mask from a projector image is described later with reference to FIG. 12.

Upon completion of step 970, process 900 returns to step 910. If at decision step 910 it is determined that there are no calibration marks remaining, process 900 ends. Upon completion of process 900, the renderer 606 will have rendered all compensation masks for a particular current projector that is not performing calibration.

Figure 10:
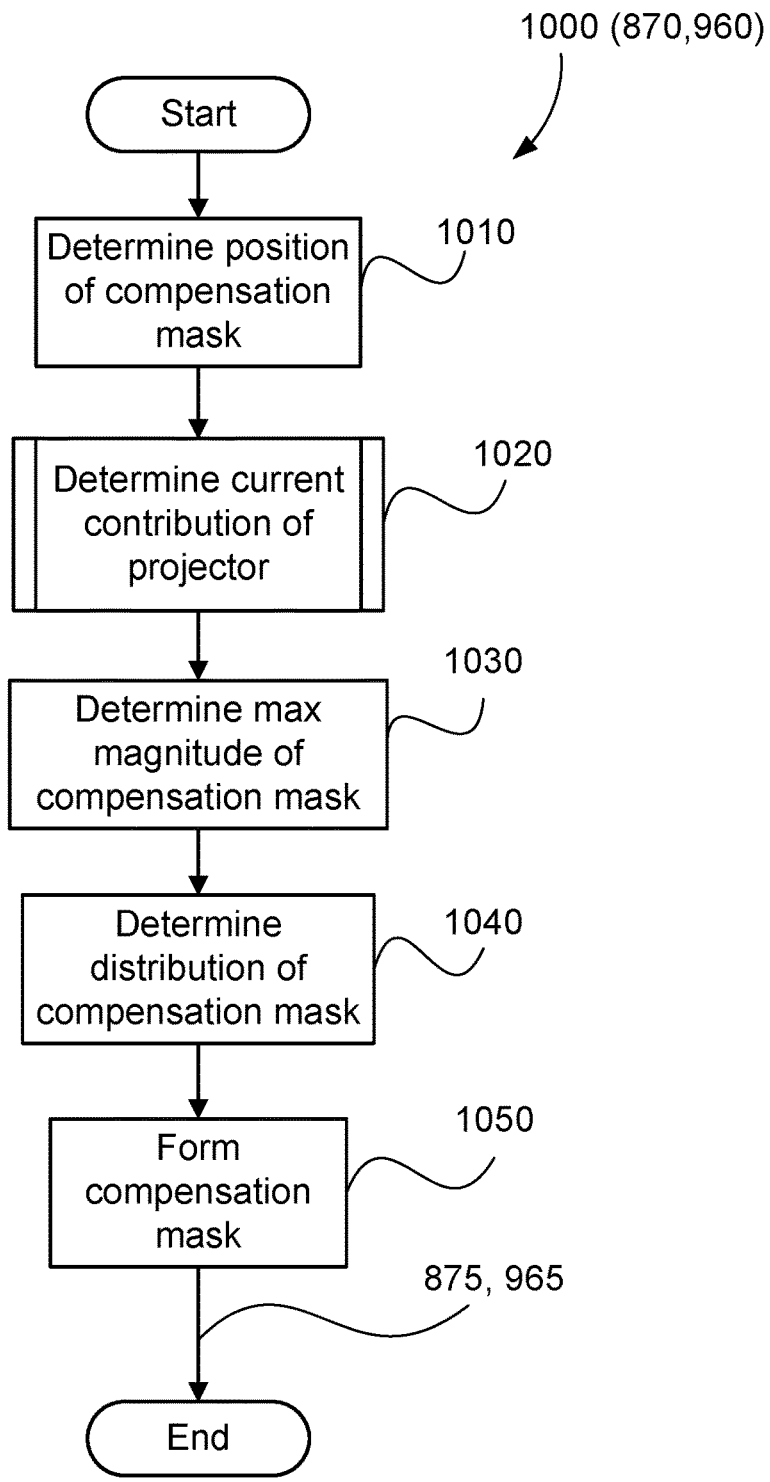
FIG. 10 is a schematic flow diagram illustrating a method of determining a compensation mask as used in the method of FIG. 8 and FIG. 9.

FIG. 10: Determining a Compensation Mask

A preferred process 1000 for determining a compensation mask (875,965), as executed at step 870 of process 800, and as also executed at step 960 of process 900, will now be described with reference to FIG. 10. Process 1000 is executed by the processor 1505 for a current projector that may or may not currently be performing calibration. Process 1000 creates a compensation mask (875, 965) containing values that may be used for either increasing or decreasing the contribution of a particular projector in the vicinity of a projected calibration mark. Process 1000 starts and proceeds to step 1010, where the position of the compensation mask (referred to as the mask position), within the projector image is determined. If the current projector is performing calibration, the mask position is equal to the position of the calibration mark (determined by process 800). If the projector is not performing calibration, the mask position is equal to the mapped position corresponding to the calibration mark (determined by process 900). As such, the compensation mask exhibits a pattern corresponding to the calibration pattern.

Process 1000 then proceeds to step 1020, where the current contribution of the projector at the mask position is determined. The current contribution is determined by processor 1505 assessing the region of the projector image that contains the determined mask position and, if the mask position is within a blend region, the actual location of the determined mask position within the blend region. A process 1100 of determining the current contribution at a particular position is described with reference to FIG. 11.

Process 1000 then proceeds to step 1030, where the maximum magnitude of the compensation mask is determined. The maximum magnitude of the compensation mask indicates how much the intensity of the projected image is modified to make a calibration mark more detectable. If the current contribution of the projector performing calibration, at the determined mask position, is low, a large maximum magnitude is determined. This will make an otherwise undetectable calibration mark detectable. If the current contribution of the projector performing calibration, at the determined mask position, is high, a small maximum magnitude is determined. In this case, the calibration mark is already fairly detectable, so only requires a small amount of compensation. An example of determining the maximum magnitude of a compensation mask is described later with reference to FIGS. 13A and 13B.

Process 1000 then proceeds to step 1040, where the distribution of the compensation mask is determined. In a preferred implementation, the compensation mask is larger than a calibration mark. At step 1040, the renderer 606 will therefore set the compensation mask dimensions to be, for example, double the dimensions of a corresponding calibration mark. The values of the compensation mask are then set according to a distribution that peaks at the maximum magnitude, determined previously at step 1030. Preferably, the distribution is smooth, so as to be largely imperceptible in the case of a small error in alignment. In a preferred implementation, the compensation mask is determined using a Gaussian distribution. An example of a Gaussian distribution of a compensation mask is described later with reference to FIGS. 14A and 14B.

Process 1000 then proceeds to step 1050, where the compensation mask is formed according to the determined maximum magnitude and distribution. More specifically, formation of the compensation mask is achieved by applying the determined maximum magnitude according to the determined distribution, to thereby achieve effectively a blend across the determined position. An example of a compensation mask is described later with reference to FIG. 14. Upon completion of step 1050, process 1000 ends. Upon completion of process 1000, a compensation mask 875, 965 is created for a particular mask position, to be used for either increasing or decreasing the contribution of a particular projector.

Figure 11:
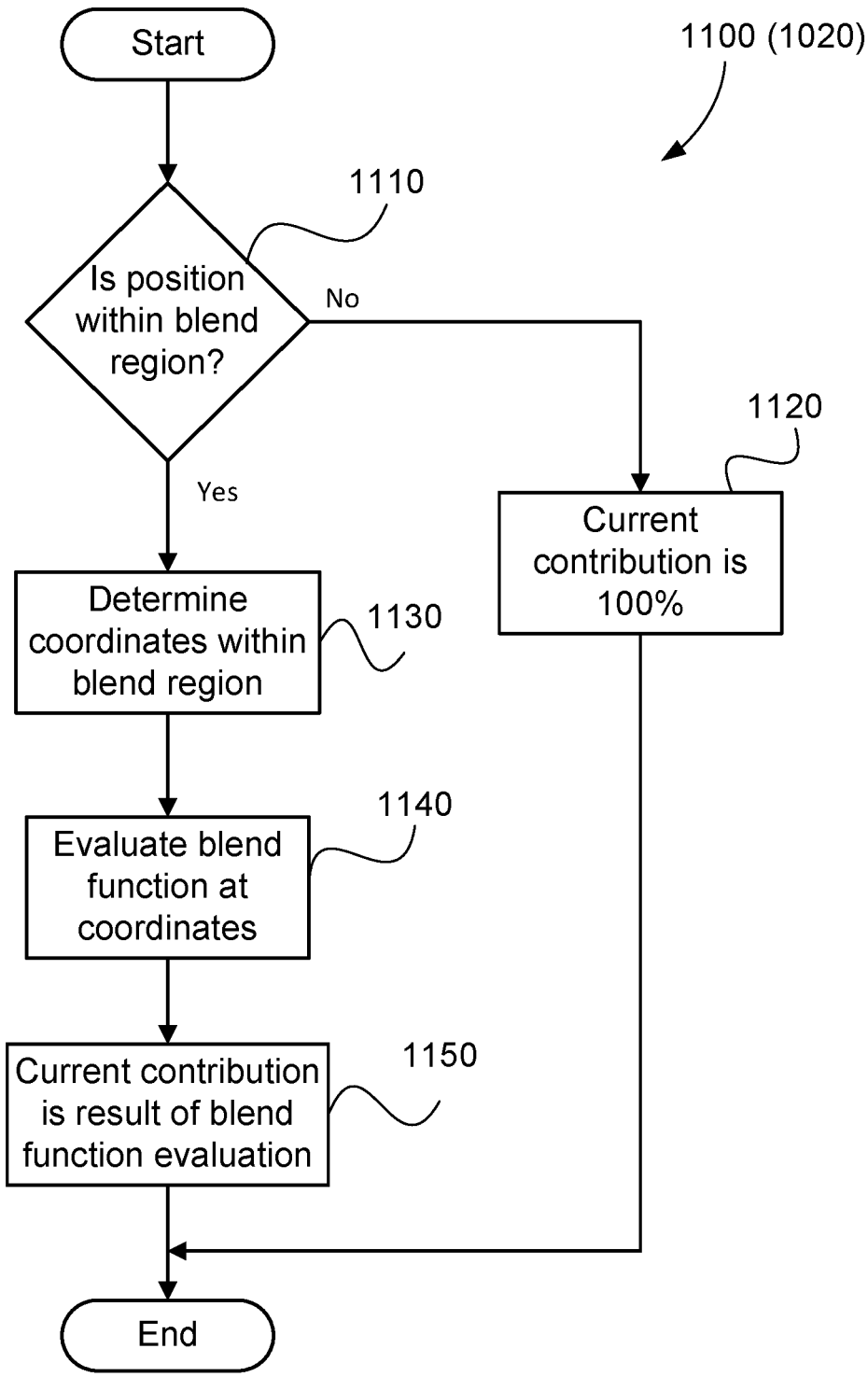
FIG. 11 is a schematic flow diagram illustrating a method of determining a current contribution at a position in a projector image as used in the method of FIG. 10.

FIG. 11: Determining Current Contribution

A preferred process 1100 for determining a current contribution at a position in a projector image, as executed at step 1020 of process 1000, will now be described with reference to FIG. 11. Process 1100 starts and proceeds to decision step 1110, where the processor 1505 determines if the position is within a blend region of the projector image. For example, it may be determined if a position within projector image 231 (described previously with reference to FIG. 2B) is within the blend region 242. If it is determined that the position is not within a blend region, process 1100 proceeds to step 1120, where the current contribution is determined to be 100%. In this case, the current projector makes the entire contribution to the projected image at the position. Process 1100 ends upon completion of step 1120.

If it is determined at step 1110 that the position is within a blend region, process 1100 proceeds to step 1130, where the coordinates of the position within the blend region are determined. The determined coordinates are preferably the coordinates of a blend function. For example, if the blend function is a 1-dimensional horizontal blend, between the values of 0 and 1, step 1130 will provide a coordinate between 0 and 1. For example, consider a position within blend region 242 of projector image 231, described previously with reference to FIG. 2B. If blend region 242 has a horizontal blend function with a value of 1 at its left edge, and a value of 0 at its right edge, the position will have a blend coordinate that is between 0 and 1, depending on its location relative to the left and right edge of the blend region 242. An example of determining a blend coordinate is described later with reference to FIGS. 13A and 13B.

Process 1100 then proceeds to step 1140, where the blend function is evaluated by the processor 1505 at the determined coordinates. The blend function is an indication of the contribution of a projector at a location in the blend region. The blend function is typically designed such that two or more overlapping projections result in an overall projection that is perceived as smooth, even, and is of the same intensity as an equivalent projection by a single projector. An example of evaluating a blend function is described later with reference to FIGS. 13A and 13B.

Process 1100 then proceeds to step 1150, where the current contribution is determined based on the blend function evaluation. In a preferred implementation, the blend function is a direct indication of the current contribution. For example, if the blend functional evaluates to 0.8 at the given position, the determined contribution is 80%. Process 1100 ends upon completion of step 1150.

Example(s)

User Case(s)

FIG. 12: Basic Process Example

An example of rendering calibration marks and modifying the contribution of a projector according to a compensation mask will now be described with reference to FIGS. 12A to 12D. The process 700 of rendering an aligned content image with embedded calibration marks and compensation masks was described previously with reference to FIG. 7 to FIG. 11. The present example is based on the example described previously with reference to FIGS. 5A to 5C. However, the present example, described with reference to FIGS. 12A to 12D, includes the modification of projector contributions with the purpose of making the projected calibration marks more detectable to cameras 121 and 122.

Figure 12A:
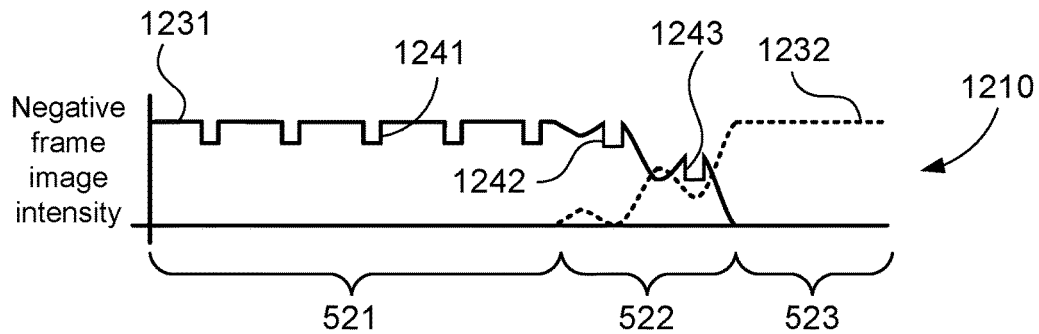
FIGS. 12A to 12D show an example of increasing the detectability of projected calibration marks.
Figure 12B:
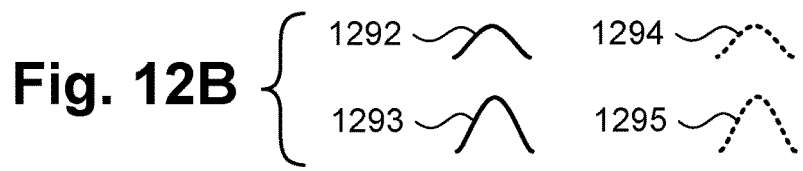

FIG. 12A shows a representation 1210 of a projected or captured negative frame, for example, negative frame 321. A projected negative frame is determined by the renderer 606 according to the process 700 described previously with reference to FIG. 7. The intensity of the contribution of the left-side projector 111 is represented by the solid line 1231, as determined at steps 740 and 760 of process 700. The intensity of the contribution of the right-side projector 112 is represented by the dashed line 1232, as determined at steps 740 and 770 of process 700. The region 411 that contains contribution of the left-side projector 111 only is represented by the portion 521 of the horizontal axis. The region 412 that contains contribution of both projectors 111 and 112 (the blend region) is represented by the portion 522 of the horizontal axis. The region 413 that contains contribution of the right-side projector 112 only is represented by the portion 523 of the horizontal axis.

The intensity 1231 of the left-side projector 111 is shown as containing calibration marks (e.g. 1241-1243) at discrete positions, for the projected or captured negative frame 1210. For example, calibration mark 1241 is subtracted from the intensity of the projector image in a negative frame (e.g. frame 321). The subtraction of calibration mark 1241 is performed by the renderer 606 at step 840 of process 800. At step 860 of process 800, it is determined that calibration mark 1241 is not overlapped by other projectors (it is within the region 241 that contains contribution of the left-side projector 111 only, as represented by the portion 521 of the horizontal axis). Therefore, a compensation mask is not applied at the position of calibration mark 1241.

Calibration mark 1242 is also subtracted from the projector image at step 840 of process 800. However, at step 860, it is determined that calibration mark 1242 is overlapped by another projector (right-side projector 112). Therefore, at step 870, a compensation mask 1292 is determined, and at step 880 compensation mask 1292 (FIG. 12B) is added to the projector image at the location of calibration mark 1242. This results in the increase in intensity of calibration mark 1242, in comparison with the corresponding calibration mark 542 described previously with reference to FIG. 5A. Steps 840, 860, 870 and 880 are repeated for calibration mark 1243, that is also overlapped by the right-side projector 112. However, calibration mark 1243 is at a different position to calibration mark 1242, and therefore results in a compensation mask 1293 of larger magnitude. This results in a larger increase in the intensity of calibration mark 1243, in comparison with the corresponding calibration mark 543 described previously with reference to FIG. 5A.

The addition of compensation masks 1292 and 1293 (FIG. 12B) increases the intensity 1231 of the left-side projector 111 in the vicinity of calibration marks 1242 and 1243, respectively. This increases the detectability of calibration marks 1242 and 1243. This also results in an increased image brightness on the projection surface 160 at these locations. To compensate for this increased brightness, compensation masks 1294 and 1295 are subtracted from the intensity 1232 of the right-side projector, at corresponding positions. This ensures that the overall projected image appearance is unaltered, and will appear smooth and seamless to a viewer.

For example, compensation mask 1294 is rendered to the projector image 322 of the right-side projector 112 at step 770 of process 700, described previously with reference to FIG. 7. At step 940 of process 900, the corresponding mapped position of calibration mark 1242 in the projector image 322 of the right-side projector 112 is determined. This is the position in projector image 322 of the right-side projector 112 at which the compensation mask 1294 is applied. At step 960, compensation mask 1294 is determined, and at step 970 compensation mask 1294 is subtracted from the projector image 322 at the location determined at step 940.

This results in the decrease in intensity 1232 of the right-side projector in the vicinity of calibration mark 1242, in comparison with the corresponding un-modified intensity 532 described previously with reference to FIG. 5A. Steps 940, 960 and 970 are repeated for calibration mark 1243. However, calibration mark 1243 is at a different location than calibration mark 1242, and therefore the mapped position determined at step 940 is different. This results in a compensation mask 1295 of larger magnitude, which produces a larger decrease in the intensity 1232 at the position of calibration mark 1243, in comparison with the corresponding position in the un-modified intensity 532 described previously with reference to FIG. 5A.

Figure 13A:
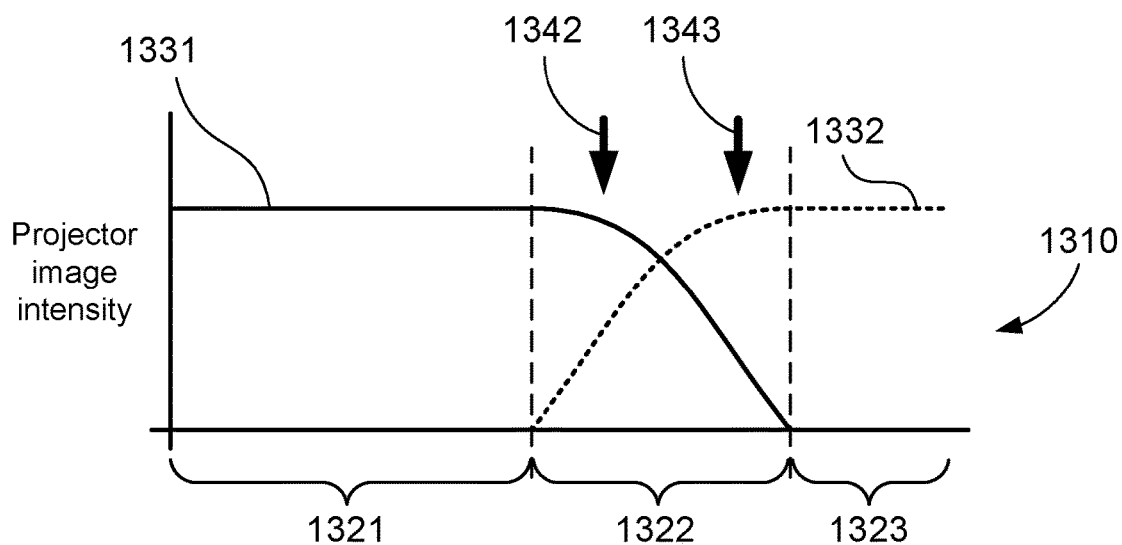
FIGS. 13A and 13B show an example of determining a current contribution at a position in a projector image.
Figure 13B:
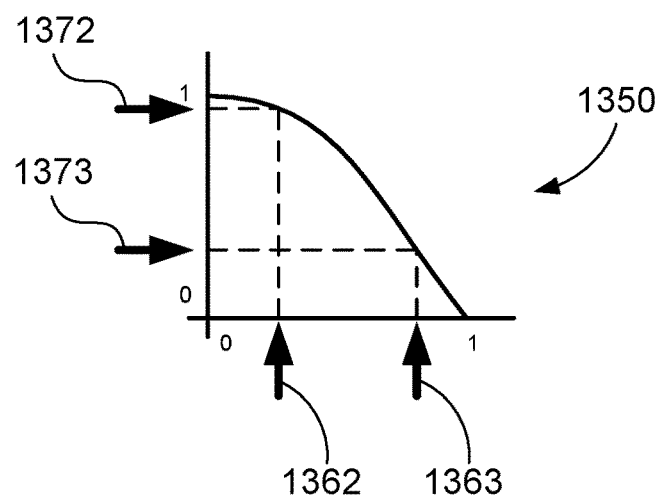

An example of determining a compensation mask, such as compensation masks 1292-1295, is described later with reference to FIGS. 13A and 13B.

Figure 12C:
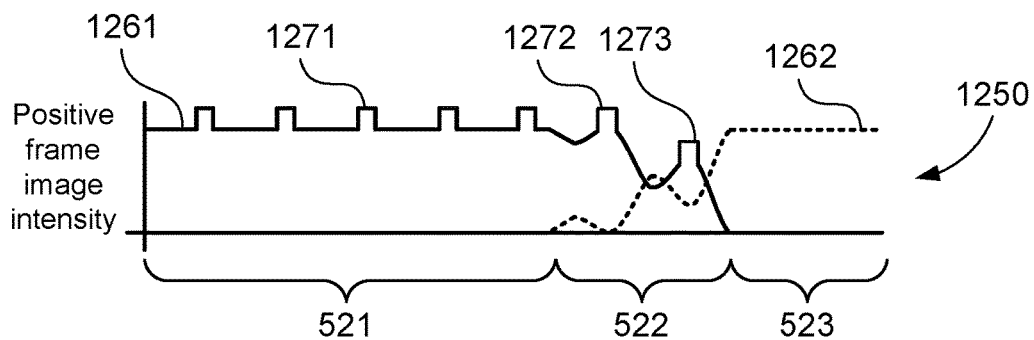
Figure 12D:
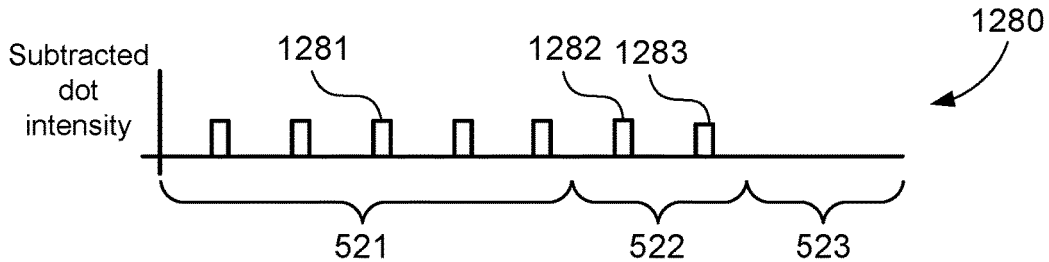

FIG. 12C shows a representation of a projected or captured positive frame 1250, for example, captured positive frame 402. A projected positive frame is determined by the renderer 606 according to the process 700 described previously with reference to FIG. 7. The intensity of the contribution of the left-side projector 111 is represented by the solid line 1261, as determined at steps 740 and 760 of process 700. The intensity of the contribution of the right-side projector 112 is represented by the dashed line 1262, as determined at steps 740 and 770 of process 700.

The intensity 1261 of the left-side projector 111 is shown as containing calibration marks (e.g. 1271-1273) at discrete positions, for the projected or captured positive frame 1250. For example, calibration mark 1271 is added to the intensity of the projector image in a positive frame (e.g. frame 322). The addition of calibration mark 1271 is performed by the renderer 606 at step 850 of process 800. At step 860 of process 800, it is determined that calibration mark 1271 is not overlapped by other projectors (it is within the region 241 that contains contribution of the left-side projector 111 only, as represented by the portion 521 of the horizontal axis). Therefore, a compensation mask is not applied at the position of calibration mark 1271.

Calibration marks 1272 and 1273 are also added to the projector image at step 850 of process 800. However, calibration marks 1272 and 1273 are determined to be overlapped by another projector (right-side projector 112), at step 860. Therefore, at step 870, compensation masks 1292 and 1293 (FIG. 12B) are determined, and at step 880, compensation masks 1292 and 1293 are added to the projector image at the location of calibration marks 1242 and 1273, respectively. This process is the same as performed for the negative frame 1210 described previously, and results in the increase in intensity of calibration marks 1272 and 1273.

The process of compensating for the increase in intensity at the location of calibration marks 1272 and 1273 is also similar to the process described previously for negative frame 1210. To summarise, at the mapped positions corresponding to calibration marks 1272 and 1273, in the projector image 322 of the right-side projector 112, compensation masks 1294 and 1295 are subtracted from the intensity 1262.

In a preferred implementation, the shape and magnitude of corresponding compensation masks for each projector are the same (complementary). For example, compensation mask 1292 for the left-side projector 111 at the location of calibration mark 1242 has the same shape and magnitude as the corresponding compensation mask 1294 for the right-side projector 112. If the alignment of the projectors is accurate, compensation masks 1292 and 1294 are projected at the same position on the projection surface 160. Due to the masks 1292 and 1294 having the same shape and magnitude, the overall projected image appearance will be unaltered, and will appear smooth and seamless to a viewer.

The addition and subtraction of compensation masks 1292-1295 serves to increase the contribution of the projector that is performing calibration (e.g. the left-side projector 111), in order to make its projected calibration marks more detectable. The increased detectability of calibration marks in the blend region is demonstrated in the representation of a subtracted frame 1280, also shown in FIG. 12D. As in the example described previously with reference to FIG. 5C, calibration mark 1281 has high intensity (detectability), because it is within a region that is projected with only the left-side projector 111, shown by the portion 521 of the horizontal axis. However, the addition and subtraction of compensation masks 1292-1295 has increased the detectability of calibration marks 1282 and 1283 in the blend region of the subtracted image 1280, in comparison with corresponding calibration marks 582 and 583 shown in FIG. 5C. Because the intensities of calibration marks 1242, 1243, 1272 and 1273 in the negative and positive frames are increased, the corresponding calibration marks 1282 and 1283 in the subtracted frame 1280 are also increased.

This increased detectability allows the pattern decoder 603 to detect the calibration marks 1282 and 1283 more effectively, and thus provide more correspondences of higher accuracy to the projector aligner 604. The projector aligner 604 will subsequently more accurately align the multiple projections.

FIG. 13, 14: Determining Compensation Mask Example

An example of determining a compensation mask, such as compensation masks 1292-1295, will now be described with reference to FIGS. 13A and 13B. An example of a projected image 1310 is shown in FIG. 13A. The projected image 1310 includes a representation 1331 of the intensity of the left-side projector 111, and a representation 1332 of the intensity of the right-side projector 112. The portion 1321 of the horizontal axis represents a region projected by the left-side projector 111 only, the portion 1322 represents a region projected by both projectors 111 and 112 (the blend region), and the portion 1323 represents the region projected by the right-side projector 112 only.

The shape of the intensities 1331 and 1332 in the portion 1322 (the blend region) is determined by a blend function. Examples discussed above made use of a linear blend function. Preferably, more complicated non-linear blend functions are used that consider the gamma (i.e. non-linearity) of projected intensity and the smoothness of the projected intensity. Any blend function known in the art may be used with the arrangements presently disclosed.

As described previously with reference to FIGS. 12A to 12C, the shape and magnitude of a compensation mask may depend on the position of the compensation mask. At step 1010 of process 1000, described previously with reference to FIG. 10, the position of a compensation mask is determined. FIG. 13A shows two example positions, 1342 and 1343, roughly corresponding with the positions of calibration marks 1242 and 1243, respectively.

At step 1020 of process 1000, the current contribution of a projector at a position is determined. At step 1110 of process 1100, it is determined if the position is within a blend region. Step 1110 will determine that the example positions 1342 and 1343 are within a blend region.

At step 1130, the coordinates of the position within the blend region are determined. As described previously with respect to FIG. 11, the determined coordinates are preferably coordinates of the blend function. In the present example, blending is performed horizontally and the blend function is a 1-dimensional horizontal blend, between the values of 0 and 1. An example blend function 1350 is shown in FIG. 13B. The pixel coordinates of the example position 1342 within the blend region are mapped to the blend function coordinates (between 0 and 1), thereby forming a dependent relationship between the determined contribution of the compensation mask and the actual used determining contribution of the compensation mask. For example, if position 1342 is at a pixel position that is 25% of the width of the blend region from the left edge of the blend region, the determined blend function coordinate is 0.25. If another example position 1343 is further from the left edge of the blend region, for example at a position that is 80% of the width of the blend region from the left edge of the blend region, the determined blend function coordinate is 0.8. These blend function coordinates 1362 and 1363 are shown on the example blend function 1350.

If the blending is in the opposite direction, for example, when determining a contribution for a position in the projector image of the right-side projector 112 (on the intensity line 1332), the determined blend function coordinate can be subtracted from 1, to arrive at the equivalent blend function coordinate for the other direction.

At step 1140, the blend function is evaluated at the determined coordinates. The blend function is typically evaluated by substituting the determined coordinates into the blend function. This process is shown graphically using the example blend function 1350 shown in FIG. 13B. For example, evaluating the blend function 1350 at blend coordinate 1362 results in a blend value 1372. Similarly, evaluating the blend function 1350 at blend coordinate 1363 results in a blend value 1373.

At step 1150 of process 1100, the current contribution at the position is set to the determined blend value. For example, for position 1342, the contribution is set to the blend value 1372. Similarly, for position 1342, the contribution is set to the blend value 1373.

At step 1030 of process 1000, the maximum magnitude of the compensation mask is determined, based on the current contribution determined by process 1100. As described previously with respect to FIG. 10, the maximum magnitude of the compensation mask indicates how much the intensity of the projected image is modified to make a calibration mark more detectable. At positions where the current contribution is low, such as at position 1343 for the projector intensity 1331, the compensation mask needs a large maximum magnitude, in order to make a corresponding calibration mark more detectable. At positions where the current contribution is high, such as at position 1362, the compensation mask needs only a small maximum magnitude in order to make a corresponding calibration mark more detectable. In a preferred embodiment, the maximum magnitude has a direct relationship with the current contribution. For example, if the current contribution is 0, the maximum magnitude is set to a large number. If the current contribution is 1, the maximum magnitude is set to 0. If the current contribution is between 0 and 1, such as for positions 1342 and 1343, the maximum magnitude is scaled appropriately.

Figures 14A, 14B:
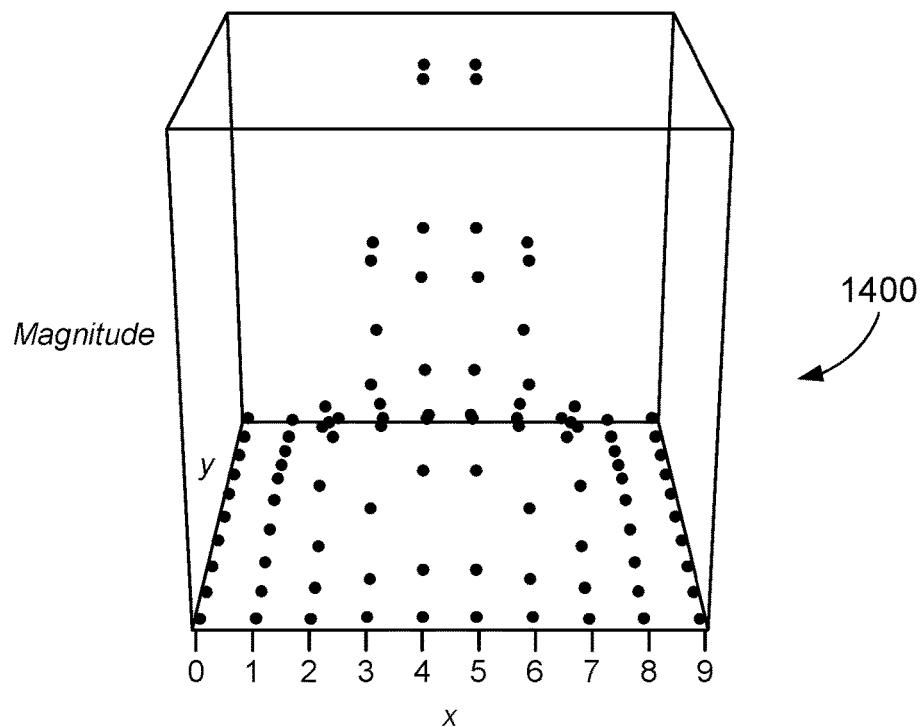
FIGS. 14A and 14B show respectively an example of a Gaussian distribution and a corresponding compensation mask.

At step 1040 of process 1000, the distribution of the compensation mask is determined. As described previously with reference to FIG. 10, the distribution is preferably smooth, has a peak in the centre (i.e. has highest magnitude at the position corresponding to the associated calibration mark), and is larger than the corresponding calibration mark. The present inventors have found that a Gaussian distribution is ideal. FIG. 14A shows a 3-dimensional representation of an example 2-dimensional Gaussian distribution 1400. The Gaussian distribution 1400 is sampled at 10 uniformly spaced locations in each of the x- and y-directions, to produce 100 samples. Each sample is shown as a small circle. Each sample location in the 2D space has a magnitude, represented by the z-direction of the 3-D representation that exhibits a Gaussian distribution having a peak in the centre of the distribution, and is smooth. If a calibration mark is, for example, 2×2 pixels, the Gaussian distribution 1400 is considered suitable. The example compensation masks 1292-1295 are 1-dimensional representations of Gaussian distributions. Using these approaches, the modification to the determined contribution of the compensation mask is varied over the overlap areas of the two projectors.

Alternatively, a simpler distribution can be used, for example, a uniform distribution over a circular area. Such distributions may serve to increase the detectability of a corresponding calibration marks, but may be visible to a viewer. Smoothly varying distributions, such as the Gaussian distribution, are therefore preferable. If the visibility of the compensation masks is not of concern, the compensation mask rendered by the projector performing calibration may be unnecessary. For example, step 880 of process 800 may be skipped, resulting in the improved detectability of the calibration marks, but visible compensation masks.

At step 1040, the renderer 606 determines a compensation mask based on the previously determined distribution and maximum magnitude. FIG. 14B shows an example of a compensation mask 1450. Compensation mask 1450 contains a value for each sample of the Gaussian distribution 1400. Each value is taken directly from the magnitude of the Gaussian distribution at the corresponding sample, but has been scaled so that the maximum value of the compensation mask 1450 is equal to the maximum magnitude determined at step 1030. In this example, the maximum magnitude is "7.02269", which is the value of the cells 1451 in the centre of the compensation mask 1450.

Other Arrangements

The method 700 of rendering one or more projector images with increased detectability of calibration marks, described previously with reference to FIG. 7 to FIG. 14, is a preferred method. Those skilled in the art will appreciate that other methods of rendering one or more projector images with increased detectability of calibration mark exist.

For example, the above described a method of rendering calibration marks within the regions currently being displayed by the projector performing calibration. For example, calibration marks are only rendered within regions 241 and 242 of projector images 321 and 322. In alternative implementations, calibration marks are also rendered outside regions currently being displayed by the projector performing calibration. For example, calibration marks may be rendered in areas of a projector image in which content is not rendered, but that overlap with the content rendered by an adjacent projector. For example, calibration marks can be rendered to areas of projected images 321 and 322 that correspond with region 413 of captured frames 401 and 402. This will increase the number of detectable dots in the subtracted frame 420. At the positions of these calibration marks, the compensation masks determined by process 1000 will have a very large magnitude.

The above arrangements also describe a method of increasing the detectability of a calibration pattern. The arrangements can also be used to increase the detectability of other patterns embedded in a projected image. For example, a pattern that encodes an identifier of the projected content, or a pattern that encodes other content that can be used to augment the projected content. The arrangements not limited by the type of projected pattern or by the data encoded by that pattern.

The arrangements disclosed operate to increase the detectability of a calibration pattern to a capture device. For example, a projected calibration pattern is photographed by cameras 121 and 122, and the images produced are used to perform alignment of the images projected by projectors 111 and 112. The properties of the capture devices (e.g. cameras 121 and 122) are therefore important. In alternative implementations, the properties of the capture devices may be used in determining compensation masks, as performed by process 1000, described with reference to FIG. 10. For example, if the exposure settings of the capture device (e.g. shutter speed, gain) are set to optimally detect calibration marks that have high intensity, the maximum magnitude of the compensation mask (determined at step 1030) can be adjusted to ensure the projected calibration marks have this intensity in the captured images. Similarly, if the capture device is known to have a low pixel resolution, the size of the compensation mask can be increased.

Similarly, the properties of the projectors (e.g. projectors 111 and 112) can be used in determining compensation masks. For example, the variation in brightness of the projector across the image may be known. Typically, the brightness of a projected image is lower at the corners of the image than in the centre of the image (known as "vignetting"). This brightness variation may affect the detectability of the projected calibration marks. The calibration marks near the corner of a projected image will be less detectable. Such calibration marks can be made more detectable by, for example, increasing the maximum magnitude of the corresponding compensation masks to thereby compensate for predetermined (known) vignetting of the compensating projector.

In alternative implementations, the dynamic range (brightness range) of the projectors is also considered when determining the compensation mask at a position. For example, if a calibration mark is rendered to a position at which the rendered content image is very bright, the detectability of the calibration mark in the captured positive frame will be reduced. To increase the detectability of such a calibration mark, the maximum intensity of the compensation mask is reduced, to prevent the intensity of the calibration mark from reaching the maximum brightness of the projector (known as "saturation" or "clipping"). In some situations, the compensation mask for a projector performing calibration can subtracted from the projected image (rather than added), to avoid this saturation. At the corresponding mapped position, an overlapping projector will project a complementary compensation mask, so that the compensation masks are imperceptible. Similarly, if the external lighting is measured or otherwise determined, for example by one of the cameras 121 or 122, and it is determined that a region of the projection surface, particularly the overlap, is particularly dark, the compensation masks at corresponding positions in the projector images can be created or modified with larger magnitude, and perhaps with larger spatial area. These changes to the compensation masks will serve to increase the detectability of projected calibration marks in these areas of the projection surface.

In alternative arrangements, the accuracy of alignment of the multiple projectors is also considered when determining a compensation mask. For example, if the alignment error at a position of a particular calibration mark is high, a compensation mask with a smaller maximum magnitude and larger area may be beneficial, in order to reduce the perceptibility of the compensation mask. If the alignment error at a particular position is low, the magnitude of the compensation mask can be increased, for example over a predetermined period of time, so as to make the corresponding calibration mark more detectable, with minimal risk of the compensation mask being perceptible to a viewer. The accuracy of alignment can be estimated by, for example, measuring the differences between the positions of corresponding points in the overlap regions of two or more projected images. One or both cameras 121 or 122 can be used to capture a projected image for each projector. The projector aligner 604 can then extract descriptive features (e.g. corner, edge, or other feature types known in the art) from each captured image in the overlap regions. The descriptive features in one image are matched with those in the other images, to form corresponding points in the two or more projections. The projector aligner 604 can then measure the distance between corresponding points, the distance being a measure of the alignment error. Estimating the accuracy of alignment thereby results in one or more measures of the alignment error at one or more positions within the overlap region, which can be used to alter the size and/or magnitude of the compensation masks, as described above.

In a preferred implementation, compensation masks are only rendered for frames in which a calibration pattern is rendered. In the event that the projectors are misaligned, the sudden display of compensation masks may be perceptible to a viewer. To make the projected compensation masks less perceptible, the masks can also be rendered for frames in which a calibration pattern is not projected. Further, the size and intensity of the compensation masks can be modified, for example gradually increased in the frames immediately prior to the projection of a calibration pattern, and gradually reduced thereafter. This approach introduces a temporal and spatial variation into the determined contribution and thus the projection of compensation masks, in order to make the compensation masks less perceptible.

INDUSTRIAL APPLICABILITY

The arrangements described are applicable to the computer and data processing industries and particularly for the display of a single image using multiple projectors in order to increase the size of the displayed image.

The foregoing describes only some embodiments of the present invention, and modifications and/or changes can be made thereto without departing from the scope and spirit of the invention, the embodiments being illustrative and not restrictive.

We claim:

1. A method of displaying an image using at least a first projector and a second projector, the method comprising:
projecting a calibration pattern using the first projector, the calibration pattern being embedded in a first portion of an image projected by the first projector;
determining a contribution of the second projector to projecting a second portion of the image to an overlap area, the overlap area having a contribution from the first and second projectors, wherein the contribution is an intensity of a colour channel;
modifying the determined contribution of the second projector to the overlap area to allow the calibration pattern of the first projector to be detectable to a capture device, the modification having a pattern corresponding to the calibration pattern; and
displaying the image using the first projector and the modified contribution of the second projector.

2. The method according to claim 1, wherein the modified contribution of the second projector in the overlap area is complementary to a contribution of the first projector.

3. The method according to claim 1, wherein the calibration pattern has a temporal variation and the modification to the determined contribution varies spatially according to the temporal variation.

4. The method according to claim 1, wherein the contribution of the first projector in the overlap area is complementary to the contribution of the second projector such that the first portion of the image in the overlap area is modified to prevent the contribution of the first projector saturating when the calibration pattern is embedded.

5. The method according to claim 1, wherein the determined contribution of the second projector is increased over a predetermined period of time to reduce user perception of changes to the image.

6. The method according to claim 1, wherein a value of the modification to the determined contribution is dependent on the determining contribution of the second projector.

7. The method according to claim 1, wherein the calibration pattern is selected from the group consisting of a plurality of regularly positioned marks, a plurality of randomly positioned marks, a regular grid, an irregular grid, and the marks.

8. The method according to claim 1, wherein the calibration pattern comprises a plurality of marks, and the method further comprises the steps of:
estimating an accuracy of alignment of the image from the first and second projector in the overlap area; and
determining a size of a spatial area of the modification of the determined contribution to be applied about the plurality of marks, the size of the spatial area being determined according to the estimated accuracy of the alignment.

9. The method according to claim 1, wherein modification of the determined contribution varies spatially across the overlap area.

10. The method according to claim 1, wherein the modification of the determined contribution is determined according to a predetermined vignetting of the second projector.

11. The method according to claim 1, wherein the calibration pattern comprises a plurality of marks and a size and intensity of the modification of the determined contribution of the second projector is varied according to properties of the capture device.

12. The method according to claim 1, wherein the contribution of each of the first and second projectors to the overlap area is varied according to a blend function and the modification of the determined contribution of the second projector is varied according to the blend function.

13. The method according to claim 1, further comprising the steps of:
determining an external lighting contribution to the overlap with the capture device; and
modifying the determined contribution of the second projector according to the determined external lighting contribution.

14. A non-transitory computer readable storage medium having a program recorded thereon, the program being executable by a processor to displaying an image using at least a first projector and a second projector, the program comprising:
code for projecting a calibration pattern using the first projector, the calibration pattern being embedded in a first portion of an image projected by the first projector;
code for determining a contribution of the second projector to projecting a second portion of the image to an overlap area, the overlap area having a contribution from the first and second projectors, wherein the contribution is an intensity of a colour channel;
code for modifying the determined contribution of the second projector to the overlap area to allow the calibration pattern of the first projector to be detectable to a capture device, the modification having a pattern corresponding to the calibration pattern; and
code for displaying the image using the first projector and the modified contribution of the second projector.

15. The computer readable storage medium according to claim 14, wherein the calibration pattern has a temporal variation and the modification to the determined contribution varies spatially according to the temporal variation.

16. The computer readable storage medium according to claim 14, wherein at least one of:
(i) the modified contribution of the second projector in the overlap area is complementary to a contribution of the first projector; and
(ii) the contribution of the first projector in the overlap area is complementary to the contribution of the second projector such that the first portion of the image in the overlap area is modified to prevent the contribution of the first projector saturating when the calibration pattern is embedded.

17. The computer readable storage medium according to claim 14, wherein at least one of:
(i) the determined contribution of the second projector is increased over a predetermined period of time to reduce user perception of changes to the image;
(ii) a value of the modification to the determined contribution is dependent on the determining contribution of the second projector.

18. Projection controller apparatus for displaying an image using at least a first projector and a second projector, the apparatus comprising a renderer including:
means for projecting a calibration pattern using the first projector, the calibration pattern being embedded in a first portion of an image projected by the first projector;

means for determining a contribution of the second projector to projecting a second portion of the image to an overlap area, the overlap area having a contribution from the first and second projectors, wherein the contribution is an intensity of a colour channel;

means for modifying the determined contribution of the second projector to the overlap area to allow the calibration pattern of the first projector to be detectable to a capture device, the modification having a pattern corresponding to the calibration pattern; and means for displaying the image using the first projector and the modified contribution of the second projector.

19. Projection controller apparatus according to claim 18, further comprising a processor, and a memory in which a program and the calibration pattern are stored, the program being executable by the processor to implement each of the means for projecting, the means for determining, the means for modifying and the means for displaying.

20. A projection system comprising:
   at least a first projector and a second projector; and
   a projection controller apparatus, coupled to each of the projectors, for displaying an image using at least the first projector and the second projector, the apparatus comprising a renderer including:
      means for projecting a calibration pattern using the first projector, the calibration pattern being embedded in a first portion of an image projected by the first projector;
      means for determining a contribution of the second projector to projecting a second portion of the image to an overlap area, the overlap area having a contribution from the first and second projectors, wherein the contribution is an intensity of a colour channel;
      means for modifying the determined contribution of the second projector to the overlap area to allow the calibration pattern of the first projector to be detectable to a capture device, the modification having a pattern corresponding to the calibration pattern; and
      means for displaying the image using the first projector and the modified contribution of the second projector.

21. A projection system according to claim 20 further comprising:
   at least one camera associated with each projector and imaging a display reproduction of the associated projector;
   the projection controller further comprising:
      a pattern decoder for decoding the calibration pattern from an image detected by the corresponding camera; and
      a projector aligner configured to determine alignment data for provision to the renderer for aligning images projected by the projectors.

* * * * *